(12) United States Patent
Stossel et al.

(10) Patent No.: US 10,759,332 B2
(45) Date of Patent: Sep. 1, 2020

(54) COMPONENT COMPRISING A FLAT DECORATIVE ELEMENT AND HOUSING

(71) Applicant: WEIDPLAS GmbH, Kusnacht (CH)

(72) Inventors: Marcel Stossel, Kaltbrunn (CH); Klemen Jakopic, Jona (CH); Enrico Dal Vecchio, Ermenswil (CH); Peter Zweifel, Pfaffikon (CH)

(73) Assignee: WEIDPLAS GMBH, Kusnacht (CH)

( * ) Notice: Subject to any disclaimer, the term of this patent is extended or adjusted under 35 U.S.C. 154(b) by 88 days.

(21) Appl. No.: 16/070,299

(22) PCT Filed: Nov. 18, 2016

(86) PCT No.: PCT/EP2016/078144
§ 371 (c)(1),
(2) Date: Jul. 16, 2018

(87) PCT Pub. No.: WO2017/121516
PCT Pub. Date: Jul. 20, 2017

(65) Prior Publication Data
US 2019/0031090 A1 Jan. 31, 2019

(30) Foreign Application Priority Data
Jan. 14, 2016 (EP) .................................... 16151297

(51) Int. Cl.
*F21V 21/00* (2006.01)
*B60Q 1/32* (2006.01)
(Continued)

(52) U.S. Cl.
CPC ............... *B60Q 1/323* (2013.01); *B60Q 3/64* (2017.02); *B60Q 3/78* (2017.02); *B60R 13/02* (2013.01);
(Continued)

(58) Field of Classification Search
CPC ........ B29C 45/14811; B60Q 1/26–323; B60Q 3/60–78; B60R 13/00–43;
(Continued)

(56) References Cited

U.S. PATENT DOCUMENTS 2,116,471 A 5/1938 Nelson
2,298,365 A 10/1942 Gits et al.
(Continued)

FOREIGN PATENT DOCUMENTS

AT 400124 B 10/1995
CA 2 366 480 A1 7/2003
(Continued)

OTHER PUBLICATIONS

International Search Report of PCT/EP2016/078144 dated Dec. 19, 2016.
(Continued)

*Primary Examiner* — Jason M Han
(74) *Attorney, Agent, or Firm* — Sughrue Mion, PLLC

(57) ABSTRACT

A component (1) is disclosed. The component (1) comprises at least one flat decorative element (2) having a visible side (3) and a back side (4), at least one layer (5, 5) having a front side (6) and a back side (7), which layer is arranged on the back side (4) of the flat decorative element (2), wherein the front side (6) faces the back side (4) of the flat decorative element (2), at least one housing (8) having an inner side (9) and an outer side (10), wherein the inner side (9) faces the back side (7) of the layer (5), wherein the housing (8) is made of a material which has a hardness that is different from the hardness of a material of which the layer (5, 5') is made, and wherein the housing (8) engages in at least one recess (26) arranged in the layer (5, 5') and/or the layer (5, 5') engages in at least one recess arranged in the housing (8).

15 Claims, 7 Drawing Sheets

(51) Int. Cl.

| | | |
|---|---|---|
| *B60R 13/02* | (2006.01) | |
| *B60Q 3/64* | (2017.01) | |
| *B60Q 3/78* | (2017.01) | |
| *G09F 13/08* | (2006.01) | |
| *G09F 13/04* | (2006.01) | |
| *G09F 13/18* | (2006.01) | |
| *G09F 21/04* | (2006.01) | |
| *F21S 45/50* | (2018.01) | |
| *F21V 8/00* | (2006.01) | |
| *B29C 45/14* | (2006.01) | |
| *F21Y 101/00* | (2016.01) | |

(52) U.S. Cl.
CPC .......... *F21S 45/50* (2018.01); *G02B 6/0051* (2013.01); *G02B 6/0065* (2013.01); *G02B 6/0076* (2013.01); *G02B 6/0088* (2013.01); *G02B 6/0093* (2013.01); *G09F 13/04* (2013.01); *G09F 13/08* (2013.01); *G09F 13/18* (2013.01); *G09F 21/04* (2013.01); *B29C 45/14811* (2013.01); *B60R 2013/0287* (2013.01); *F21Y 2101/00* (2013.01); *G02B 6/006* (2013.01); *G09F 2013/044* (2013.01)

(58) Field of Classification Search
CPC ........... B60R 2013/0287; F21S 45/50; G02B 6/0051–0093; G09F 13/04–18; G09F 21/04; G09F 2013/044
USPC ................................ 362/520–522, 540–549
See application file for complete search history.

(56) References Cited

U.S. PATENT DOCUMENTS

| | | | |
|---|---|---|---|
| 2,623,315 | A | 12/1952 | Owen et al. |
| 2,886,911 | A | 5/1959 | Hardesty |
| 3,531,881 | A | 10/1970 | Carley |
| 3,839,129 | A | 10/1974 | Neumann |
| 4,140,405 | A | 2/1979 | Shapiro et al. |
| 4,220,681 | A | 9/1980 | Narita |
| 4,260,655 | A | 4/1981 | Zoller |
| 4,783,920 | A | 11/1988 | Muller-Tolk |
| 4,985,194 | A | 1/1991 | Watanabe |
| 5,568,367 | A | 10/1996 | Park |
| 5,975,711 | A | 11/1999 | Parker et al. |
| 6,132,834 | A | 10/2000 | Ackeret et al. |
| 6,242,163 | B1 | 6/2001 | Stampfl et al. |
| 6,416,844 | B1 | 7/2002 | Robson |
| 6,764,924 | B2 | 7/2004 | Gmür |
| 6,939,597 | B2 | 9/2005 | Winget et al. |
| 7,287,892 | B1 | 10/2007 | Pang et al. |
| 7,712,933 | B2 | 5/2010 | Fleischmann et al. |
| 8,408,773 | B2 * | 4/2013 | Judge .................. B60Q 1/2696 362/605 |
| 2001/0040393 | A1 | 11/2001 | Sano et al. |
| 2002/0041964 | A1 | 4/2002 | Winget et al. |
| 2002/0098611 | A1 | 7/2002 | Chang et al. |
| 2003/0007344 | A1 | 1/2003 | Parker |
| 2004/0128882 | A1 | 7/2004 | Glass |
| 2006/0061138 | A1 | 3/2006 | Radu et al. |
| 2007/0132132 | A1 | 6/2007 | Saelen et al. |
| 2007/0227055 | A1 | 10/2007 | Lapointe |
| 2008/0025039 | A1 | 1/2008 | Guillermo |
| 2008/0037284 | A1 | 2/2008 | Rudisill |
| 2009/0226667 | A1 | 9/2009 | Ohashi |
| 2011/0116286 | A1 | 5/2011 | Rudek et al. |
| 2012/0281151 | A1 | 11/2012 | Abe |
| 2012/0320615 | A1 | 12/2012 | Englert |
| 2012/0327673 | A1 | 12/2012 | Ureta Hortigüela et al. |
| 2014/0063844 | A1 | 3/2014 | Que et al. |

FOREIGN PATENT DOCUMENTS

| | | |
|---|---|---|
| DE | 2910320 A1 | 6/1980 |
| DE | 3006457 A1 | 8/1981 |
| DE | 4006649 C1 | 8/1991 |
| DE | 4131340 C1 | 11/1992 |
| DE | 4421942 A1 | 1/1996 |
| DE | 9321214 U1 | 10/1996 |
| DE | 19729780 C1 | 1/1999 |
| DE | 19732425 A1 | 2/1999 |
| DE | 19833039 A1 | 1/2000 |
| DE | 29915399 U1 | 1/2000 |
| DE | 19948664 A1 | 4/2001 |
| DE | 20103133 U1 | 7/2001 |
| DE | 10016714 A1 | 10/2001 |
| DE | 10102774 A1 | 8/2002 |
| DE | 69712685 T2 | 9/2002 |
| DE | 1338399 A1 | 8/2003 |
| DE | 10322187 A1 | 12/2003 |
| DE | 10211171 A1 | 1/2004 |
| DE | 10260831 B3 | 4/2004 |
| DE | 20219391 U1 | 5/2004 |
| DE | 202004008681 U1 | 8/2004 |
| DE | 10332975 A1 | 2/2005 |
| DE | 102005044447 A1 | 3/2007 |
| DE | 202006018515 U1 | 3/2007 |
| DE | 102007020418 A1 | 10/2008 |
| DE | 102008000375 A1 | 10/2008 |
| DE | 102007024529 A1 | 11/2008 |
| DE | 10 2010 011 544 A1 | 9/2011 |
| DE | 102010030911 A1 | 1/2012 |
| DE | 10 2010 036 795 A1 | 2/2012 |
| DE | 102010036795 A1 | 2/2012 |
| DE | 102011016394 A1 | 10/2012 |
| DE | 202013002024 U1 | 3/2013 |
| DE | 102011122615 A1 | 6/2013 |
| DE | 102012101315 A1 | 8/2013 |
| DE | 102012215771 A1 | 3/2014 |
| DE | 102013100941 A1 | 7/2014 |
| DE | 102014216780 A1 | 3/2015 |
| DE | 102013016230 A1 | 4/2015 |
| DE | 102013223244 A1 | 5/2015 |
| DE | 10 2014 003 527 A1 | 9/2015 |
| DE | 20 2015 104 364 U1 | 12/2015 |
| EP | 0196988 A1 | 10/1986 |
| EP | 0282392 A1 | 9/1988 |
| EP | 0492532 A2 | 7/1992 |
| EP | 0942820 A1 | 9/1999 |
| EP | 0979760 A1 | 2/2000 |
| EP | 1219401 A2 | 7/2002 |
| EP | 1338398 A1 | 8/2003 |
| EP | 1344687 A2 | 9/2003 |
| EP | 1422192 A1 | 5/2004 |
| EP | 1484173 A2 | 12/2004 |
| EP | 1 691 131 A1 | 8/2006 |
| EP | 2028046 A1 | 2/2009 |
| EP | 2322962 A1 | 5/2011 |
| EP | 2604406 A1 | 6/2013 |
| EP | 2684744 A1 | 1/2014 |
| EP | 2762362 A1 | 8/2014 |
| FR | 2387708 A1 | 11/1978 |
| FR | 2906513 A1 | 4/2008 |
| FR | 2937603 A1 | 4/2010 |
| FR | 2937604 A1 | 4/2010 |
| FR | 2937929 A1 | 5/2010 |
| FR | 3008774 A1 | 1/2015 |
| GB | 2475940 A | 6/2011 |
| JP | 59001236 A | 1/1984 |
| JP | 562108019 A | 5/1987 |
| JP | 1222944 A | 9/1989 |
| JP | H06134805 A | 5/1994 |
| JP | H08281701 A | 10/1996 |
| JP | H0952255 A | 2/1997 |
| JP | 10-282911 A | 10/1998 |
| JP | H10264202 A | 10/1998 |
| JP | H10278076 A | 10/1998 |
| JP | 2006160136 A | 6/2006 |
| JP | 2007118376 A | 5/2007 |
| JP | 2007-329089 A | 12/2007 |

(56) References Cited

FOREIGN PATENT DOCUMENTS

| | | | |
|---|---|---|---|
| JP | 2009298005 | A | 12/2009 |
| WO | 97/38840 | A1 | 10/1997 |
| WO | 98/42486 | A1 | 10/1998 |
| WO | 02/061380 | A2 | 8/2002 |
| WO | 03061941 | A1 | 7/2003 |
| WO | 2004000524 | A1 | 12/2003 |
| WO | 2009049435 | A1 | 4/2009 |
| WO | 2009/075924 | A1 | 6/2009 |
| WO | 2011029207 | A1 | 3/2011 |
| WO | 2011/103692 | A1 | 9/2011 |
| WO | 2011103692 | A1 | 9/2011 |
| WO | 2013014171 | A1 | 1/2013 |
| WO | 2014122078 | A1 | 8/2014 |
| WO | 2015/109216 | A1 | 7/2015 |
| WO | 2016193384 | A1 | 12/2016 |

OTHER PUBLICATIONS

International Preliminary Report on Patentability with translation of the Written Opinion dated Jul. 26, 2018, in counterpart International Application No. PCT/EP2016/078144.

\* cited by examiner

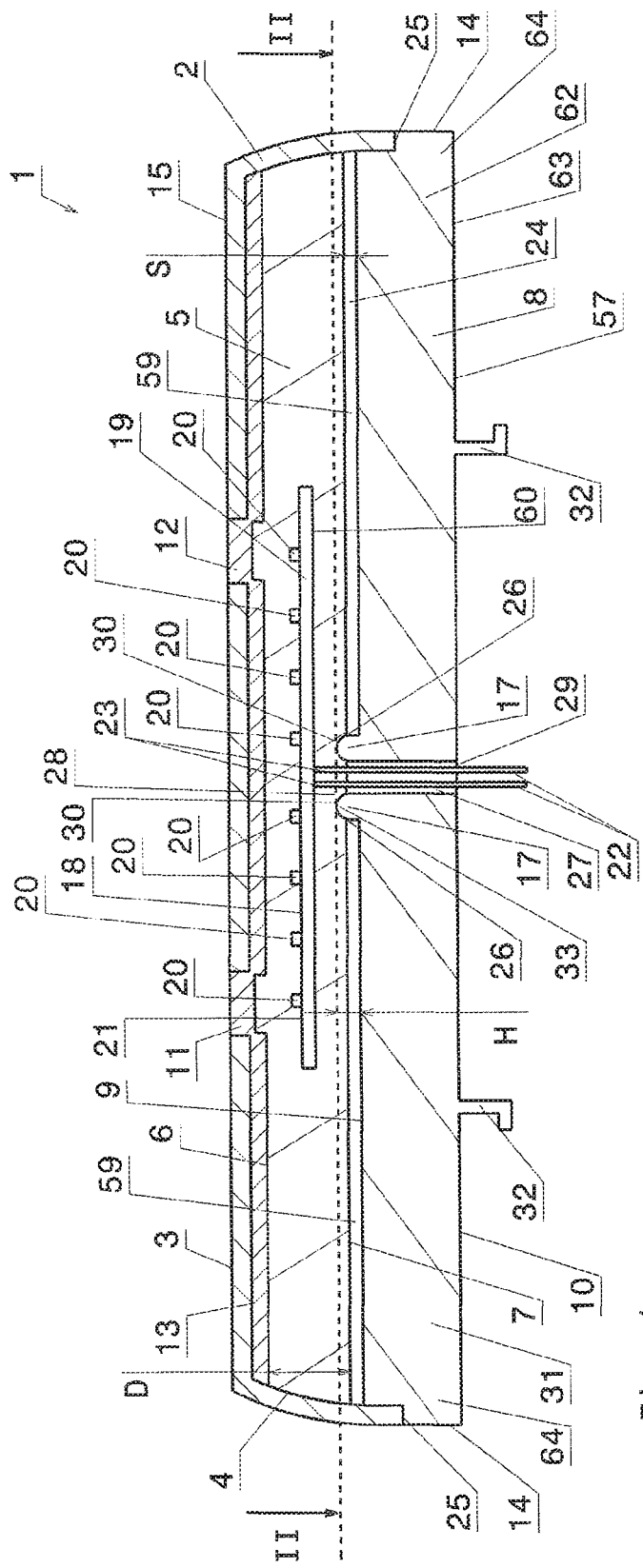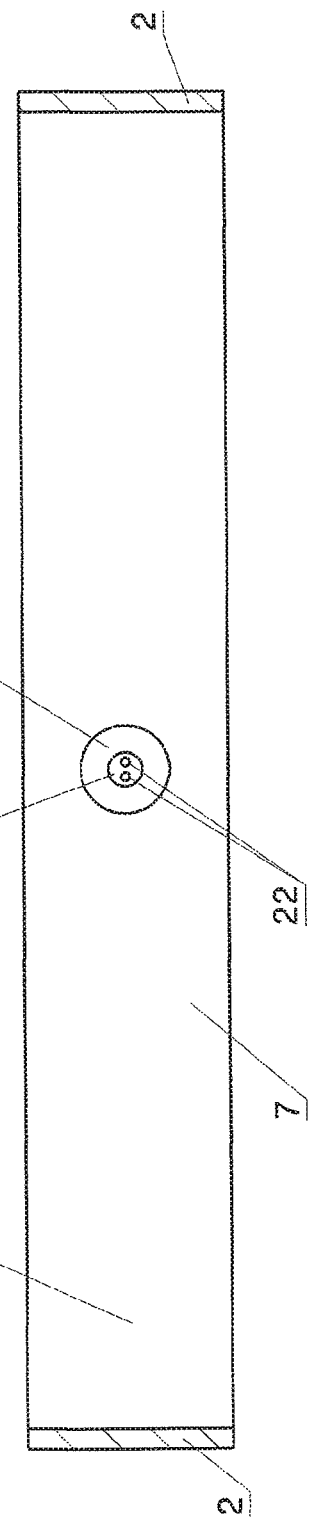
Fig. 1
Fig. 2

COMPONENT COMPRISING A FLAT DECORATIVE ELEMENT AND HOUSING

CROSS REFERENCE TO RELATED APPLICATIONS

This application is a National Stage of International Application No. PCT/EP2016/078144 filed Nov. 18, 2016, claiming priority based on European Patent Application No. 16151297.5 filed Jan. 14, 2016.

TECHNICAL FIELD

The present invention relates to a component, in particular a component for a vehicle.

PRIOR ART

DE 10 2010 036 795 A1 discloses a trim panel unit for a motor vehicle having an integrated lighting system and a method for the production thereof. During the production of the lighting system, a lighting unit having an applied adhesive layer is placed in a pre-produced recess of a carrier. The adhesive layer is used to fix the lighting unit in the recess. In an alternative way of fastening the lighting unit in the recess, a sprayed adhesive is applied to the bottom of the recess, after which the lighting unit is placed in the recess. Fixing the lighting unit by means of an adhesive layer or a sprayed adhesive is complex and expensive. According to another variant, the lighting unit is not adhesively bonded but simply placed in the recess. The disadvantage here is that noise emissions can arise due to a movement of the lighting unit relative to the recess. In order as far as possible to avoid movement of the lighting unit relative to the recess, the lighting unit must fit as accurately as possible with the recess. Producing such a lighting unit and a corresponding recess is very complex and expensive. Moreover, the movement of the lighting unit makes the illumination of the trim panel unit nonuniform. This is the case especially when the lighting unit is formed by a light guide and a lighting element, e.g. an LED, thus allowing the light guide to move relative to the lighting element which couples light into the light guide.

DE 10 2010 036 795 A1 furthermore describes that a connection cable is secured on the lighting unit in order to supply said lighting unit with electric power, wherein the connection cable is passed out of the housing or out of the trim panel unit via an aperture in the housing. The disadvantage with this solution is that contaminants, e.g. liquids or solids, can get into the housing via the aperture, in particular into a gap between the lighting unit and the housing. Particularly if the lighting unit is formed from a light guide and a lighting element, e.g. an LED, contaminants can get into a gap between the light guide and the housing, into a gap between the light guide and the lighting element or into a gap between the lighting element and the housing, for example, thus compromising the illumination of the trim panel unit.

DESCRIPTION OF THE INVENTION

Thus, it is an object of the present invention to provide a component which can be produced in a simpler way, is more functionally reliable and furthermore has advantageously low noise emissions.

To achieve this object, the present invention makes available a component comprising a two-dimensionally extending decorative element having a visible side and a back side, a layer produced from a first material or a plurality of layers produced from first materials, wherein the one or more layers is/are each arranged on the back side of the two-dimensionally extending decorative element and each has a front side and a rear side, wherein the front side in each case faces the back side of the two-dimensionally extending decorative element, and a housing produced from a second material and having an inner side and an outer side, wherein the inner side faces the respective rear sides of the one or more layers, wherein the first material or materials has/have hardnesses which are in each case different to the hardness of the second material, and wherein the housing engages in at least one recess, which is arranged at least in one of the one or more layers and/or at least one of the one or more layers engages in at least one recess arranged in the housing.

Since the housing engages in at least one recess arranged in at least one of the one or more layers and/or since at least one of the one or more layers engages in at least one recess arranged in the housing, the risk is reduced that the corresponding at least one layer can move relative to the housing or that the housing can move relative to the corresponding layer. By virtue of this connection between the housing and the at least one layer, the component can be produced more simply and preferably, at the same time, in such a way that it generates lower noise emissions. Moreover, it is possible in this way for the layer and the housing to be well fastened to one another. By virtue of the engagement of the at least one layer in the housing or of the housing in the at least one layer, there is furthermore a reduction in the risk that contaminants, e.g. liquids or solids, can get between the layer and the housing. Once the housing and the layer have been joined, the housing and the layer can fit against one another particularly snugly in the region or regions of mutual engagement, by virtue of the differences in hardness. This further reduces the risk of relative movements between the housing and the corresponding layer and, furthermore, particularly good, at least partial sealing of any space or gap between the inner side of the housing and the rear side of the layer is possible. Thus, the component according to the invention is more secure against contamination and thus more functionally reliable than prior art components.

The housing preferably engages in each of the one or more layers, i.e. in each of the layers at least one recess is provided, or each of the one or more layers engages in at least one recess arranged in the housing. However, it is also possible for just a single layer or a certain number of the one or more layers to be in engagement with the housing.

Where the terms "a layer" or "the layer" are used below, then, for the sake of simplicity, this preferably refers in each case to any of the one or more layers, unless indicated otherwise. More preferably, however, a layer of the one or more layers which is in engagement with the housing is intended. Even more preferably, all the layers of the one or more layers which are in engagement with the housing are intended. Most preferably, however, all of the one or more layers are in fact intended. Thus, the expressions "a layer" and "the layer" below can in each case refer either to a single layer or to a plurality of layers. The same applies mutatis mutandis to the expressions directly associated with the layer, such as especially "the first material", "the front side" and "the rear side", which can accordingly be understood in the singular or plural, depending on whether a single layer or a plurality of layers is concerned.

The feature that the decorative element is two-dimensionally extending means that the decorative element is of significantly larger dimensions, in particular many times larger, in two dimensions than in a third dimension, which is generally perpendicular to the extent of the surface of the visible side of the decorative element. The two-dimensionally extending decorative element is of strip-shaped design, for example, in particular being designed as a strip.

Location and direction indications such as top, bottom, vertical, horizontal, upward and downward should each be understood below in relation to the visible side of the component. Here, the visible side of the component is usually at the top and a back side of the component is usually arranged at the bottom. It is immaterial here in what location and position the component is in fact mounted, in a vehicle for example, in relation to the direction of gravity.

According to a development of the invention, the housing has at least one element which is preferably designed as a sealing element, by means of which the housing engages in at least one recess arranged in the layer. The element is preferably designed as an elevation. The element is square or triangular or of any other desired shape in cross section, for example. The element preferably has an undercut. This offers the advantage that the layer and the housing are fastened particularly well to one another. The material of the layer preferably fits snugly against at least a partial area of a surface of the element, thus allowing good, at least partial sealing of any space or gap arranged between the rear side of the layer and the inner side of the housing. As a particular preference, the shape of at least one section of the element corresponds to the shape of the recess in which the section of the element engages. Particularly good, at least partial sealing of any space or gap arranged between the rear side of the layer and the inner side of the housing is thereby possible. The housing preferably has a main body and the at least one element, wherein the main body is preferably connected integrally to the element. The main body and the element of the housing can also be of two-piece design, for example, wherein the element is joined materially to the main body, for example.

According to a development of the invention, the layer has at least one element which is preferably designed as a sealing element, by means of which the layer engages in at least one recess arranged in the housing. The element is preferably designed as an elevation. The element is square or triangular or of any other desired shape in cross section, for example. The element preferably has an undercut. This offers the advantage that the layer and the housing are fastened particularly well to one another. The material of the housing preferably fits snugly against at least a partial area of a surface of the element, thus allowing good, at least partial sealing of any space or gap arranged between the rear side of the layer and the inner side of the housing. As a particular preference, the shape of at least one section of the element corresponds to the shape of the recess in which the section of the element engages. Particularly good, at least partial sealing of any space or gap arranged between the rear side of the layer and the inner side of the housing is thereby possible. The at least one layer preferably has a main body and the at least one element, wherein the main body is preferably connected integrally to the element. The main body and the element of the layer can also be of two-piece design, for example, wherein the element is joined materially to the main body, for example.

According to a development of the invention, the second material, from which the housing is produced, has a hardness which is greater than the hardness of the first material or materials. The first material or materials thus preferably have hardnesses which are in each case lower than the hardness of the second material. In respect of the engagement of the housing in the layer, this results in at least two variants:

According to a first, preferred variant, the at least one recess is generated in the layer by the housing as the housing and the layer are joined owing to the greater hardness of the housing in comparison with the hardness of the layer. The housing then simultaneously engages in the layer during the joining process. During the joining of the layer and the housing, the first material of the layer is thus displaced and/or compressed and/or deformed, preferably elastically deformed, by the second material of the housing, and the recess is thereby generated in the layer. Once the housing and the layer have been joined, the layer thus fits particularly snugly against the housing engaging in the recess of the layer owing to the lower hardness of said layer in comparison with the hardness of the housing, and particularly good, at least partial sealing of any space or gap which is arranged between the inner side of the housing and the rear side of the layer is thus possible. Moreover, the housing and the layer are thereby fastened particularly well to one another. Particularly good sealing and fastening can be achieved if the material of the layer is deformed, in particular elastically deformed, by the material of the housing.

According to a second variant, the layer already has at least one pre-produced recess. During the joining of the layer and the housing, the housing in this second variant thus engages in at least one pre-produced recess already arranged in the layer. Thus, no recess is formed during the joining of the layer and the housing.

It is of course possible, in the second variant too, for the first material of the layer additionally to be displaced and/or compressed and/or deformed, preferably elastically deformed, by the second material of the housing or, in the first, preferred variant, for the layer additionally to have at least one pre-produced recess. Both in the second variant and in the first, preferred variant, the housing and the layer can be connected to one another by at least one pre-produced recess and by at least one recess generated during the joining process.

According to a development of the invention, the at least one recess is a pre-produced recess.

According to a development of the invention, the first material, from which the layer is produced, can be displaced by the second material, from which the housing is produced.

According to a development of the invention, the first material, from which the layer is produced, can be compressed by the second material, from which the housing is produced.

According to a development of the invention, the first material, from which the layer is produced, can be deformed, in particular elastically deformed, by the second material, from which the housing is produced.

If the first material, from which the layer is produced, can be displaced and/or compressed and/or deformed, in particular elastically deformed, by the second material, from which the housing is produced, then it is possible, through the selection of the hardness of the first material, from which the layer is produced, relative to the hardness of the second material, from which the housing is produced, to set a defined gap, preferably containing air, between the rear side of the layer and the inner side of the housing during the joining of the layer and the housing, during which the housing engages in the layer. This defined setting is advantageous particularly if the layer is provided particularly for light guidance and is thus produced from a translucent material, in particular a transparent material.

According to a development of the invention, the first material, from which the layer is produced, has a hardness which is greater than the hardness of the second material, from which the housing is produced. In respect of the engagement of the layer in the housing, at least two variants are thereby obtained:

According to a first, preferred variant, the at least one recess is generated in the housing by the layer as the housing and the layer are joined owing to the greater hardness of the layer in comparison with the hardness of the housing. The layer then simultaneously engages in the housing during the joining process. During the joining of the layer and the housing, the second material of the housing is thus displaced and/or compressed and/or deformed, preferably elastically deformed, by the first material of the layer, and the recess arranged in the housing is thereby generated. Once the housing and the layer have been joined, the housing thus fits particularly snugly against the layer engaging in the recess of the housing owing to the lower hardness of said housing in comparison with the hardness of the layer, and particularly good, at least partial sealing of any space or gap which is arranged between the inner side of the housing and the rear side of the layer is thus possible. Moreover, the housing and the layer are thereby fastened particularly well to one another. Particularly good sealing and fastening can be achieved if the material of the housing is deformed, in particular elastically deformed, by the material of the layer.

According to a second variant, the housing already has at least one pre-produced recess. During the joining of the layer and the housing, the layer in this second variant thus engages in at least one pre-produced recess already arranged in the housing. Thus, no recess is formed during the joining of the layer and the housing.

It is of course possible, in the second variant too, for the second material of the housing additionally to be displaced and/or compressed and/or deformed, preferably elastically deformed, by the first material of the layer or, in the first, preferred variant, for the housing additionally to have at least one pre-produced recess. Both in the second variant and in the first, preferred variant, the housing and the layer can have at least one pre-produced recess and be connected to one another by at least one recess generated during the joining process.

According to a development of the invention, the second material, from which the housing is produced, can be displaced by the first material, from which the layer is produced.

According to a development of the invention, the second material, from which the housing is produced, can be compressed by the first material, from which the layer is produced.

According to a development of the invention, the second material, from which the housing is produced, can be deformed, in particular elastically deformed, by the first material, from which the layer is produced.

If the second material, from which the housing is produced, can be displaced and/or compressed and/or deformed, in particular elastically deformed, by the first material, from which the layer is produced, then it is possible, through the selection of the hardness of the first material, from which the layer is produced, relative to the hardness of the second material, from which the housing is produced, to set a defined gap, preferably containing air, between the rear side of the layer and the inner side of the housing during the joining of the layer and the housing, during which the layer engages in the housing. This defined setting is advantageous particularly if the layer is provided particularly for light guidance and is thus produced from a translucent material, in particular a transparent material.

According to a development of the invention, the housing is produced from plastic, metal, glass or ceramics, preferably from plastic. The plastic preferably comprises at least one thermoplastic and/or at least one thermoset, more preferably at least one thermoplastic. The thermoplastic is acrylonitrile butadiene styrene (ABS), polyamide (PA), polymethylmethacrylate (PMMA), polycarbonate (PC), polyethylene terephthalate (PET), polyethylene (PE), polypropylene (PP), polystyrene (PS), polyetheretherketone (PEEK) or polyvinylchloride (PVC), for example. If the housing is produced from plastic, the hardness of the plastic of the housing is preferably measured in accordance with DIN EN ISO 2039-1, June 2003. The plastic of the housing preferably has a ball impression hardness, measured in accordance with DIN EN ISO 2039-1, June 2003, in the range of 10-200 N/mm$^2$ (Newtons/square millimeter). A housing manufactured from plastic and having such a hardness is proof against deformation and thus reliable in terms of assembly. Moreover, the housing which is produced from a material which has a hardness in the stated range can reliably engage in a part of the component, e.g. the layer or a diffuser, which is produced from a material, in particular a plastic, which has a comparatively lower hardness. The plastic of the housing is preferably opaque. This offers the advantage that light emitted by any lighting element of the component cannot escape from the component via the housing.

According to a development of the invention, the layer is produced from plastic or glass, preferably from plastic. The plastic preferably comprises at least one thermoplastic and/or at least one thermoset and/or at least one elastomer, more preferably at least one thermoplastic and/or at least one elastomer, even more preferably at least one elastomer. The thermoplastic is acrylonitrile butadiene styrene (ABS), polyamide (PA), polymethylmethacrylate (PMMA), in particular a PMMA block copolymer, polycarbonate (PC), polyethylene terephthalate (PET), polyethylene (PE), polypropylene (PP), polystyrene (PS), polyetheretherketone (PEEK) or polyvinylchloride (PVC), for example. The elastomer is silicone, for example, in particular silicone rubber.

If the layer is produced from plastic and the plastic comprises at least one thermoplastic and/or at least one thermoset, preferably at least one thermoplastic, the hardness of the plastic of the layer is preferably measured in accordance with DIN EN ISO 2039-1, June 2003. The plastic of the layer, comprising at least one thermoplastic and/or at least one thermoset, preferably at least one thermoplastic, preferably has a ball impression hardness, measured in accordance with DIN EN ISO 2039-1, June 2003, in the range of 10-200 N/mm$^2$.

If the layer is produced from plastic and the plastic comprises at least one elastomer, preferably silicone, more preferably silicone rubber, the hardness of the plastic of the layer is preferably measured in accordance with DIN ISO 7619-1, February 2012. The plastic of the layer, comprising at least one elastomer, preferably has a Shore A hardness, measured in accordance with DIN ISO 7619-1, February 2012, in the range of 5-90.

If the layer has a ball impression hardness in the range of 10-200 N/mm$^2$ or a Shore A hardness in the range of 5-90, in particular a Shore A hardness in the range of 5-90, wherein the ball impression hardness is measured in accordance with DIN EN TSO 2039-1, June 2003, and the Shore A hardness is measured in accordance with DIN ISO 7619-1, February 2012, the layer fits particularly snugly against a part of the component, e.g. the housing, a further layer or a diffuser, which is produced from a comparatively harder material, in particular from a comparatively harder plastic, than the layer, and thus the layer provides a particularly good sealing relative to the part of the component, e.g. the housing, the further layer or the diffuser.

The first material, preferably a plastic, from which the layer is produced, is preferably of translucent, in particular transparent, design, with the result that the layer allows light through and, in particular, can guide light. The layer preferably has a reflective layer, e.g. on a rear side and/or on a front side, or light deflecting structures, optionally connected integrally to the layer, are arranged on a rear side and/or on a front side of the layer, or light deflecting structures are incorporated into a rear side and/or into a front side of the layer. The reflective layer or the light deflecting structures ensure that light which is propagating within the layer, in particular by total reflection, is coupled out of the layer in a defined manner.

If the layer is produced from a translucent material, in particular a transparent material, the layer is preferably produced from silicone or PMMA block copolymer, more preferably from silicone, even more preferably from silicone rubber. The use of silicone, in particular silicone rubber, as a material for the production of the layer, has the advantage that the hardness of silicone, in particular silicone rubber, is easily adjustable and that silicone, in particular silicone rubber, has a low viscosity, and it is therefore possible by means of silicone, in particular silicone rubber, to produce fine light deflecting structures.

According to a development of the invention, the second material, from which the housing is produced, has a ball impression hardness in the range of 10-200 N/mm$^2$, and the first material, from which the layer is produced, has a ball impression hardness in the range of 10-200 N/mm$^2$ or a Shore A hardness in the range of 5-90, preferably a Shore A hardness in the range of 5-90, wherein the ball impression hardness is measured in accordance with DIN EN ISO 2039-1, June 2003, and the Shore A hardness is measured in accordance with DIN ISO 7619-1, February 2012. In the case where the housing has a greater hardness than the layer, this offers the advantage that the housing can engage optimally in the layer and the layer can fit snugly in an optimum manner against the engaging region of the housing. Moreover, this embodiment is particularly conducive to assembly. In the case where the layer has a greater hardness than the housing, this offers the advantage that the layer can engage optimally in the housing and the housing can fit snugly in an optimum manner against the engaging region of the layer. Moreover, this embodiment is particularly conducive to assembly.

According to a development of the invention, a gap, in particular an air-filled gap, is arranged between the rear side of the layer and the inner side of the housing. This gap is advantageous, in particular, if the layer is provided for the purpose of guiding light, which is preferably provided for back-lighting the back side of the two-dimensionally extending decorative element. A gap is preferably likewise arranged between two directly adjacent layers or between one layer and a diffuser which are directly adjacent. This allows improved light guidance within the layer.

According to a development of the invention, the housing, preferably the at least one element of the housing which is preferably designed as a sealing element, engages without interruptions or with interruptions, preferably without interruptions, in the at least one recess, and/or the layer, preferably the at least one element of the layer which is preferably designed as a sealing element, engages without interruptions or with interruptions, preferably without interruptions, in the at least one recess. The layer and/or the housing preferably has/have a circumferential edge region, wherein the housing, preferably the at least one element of the housing which is preferably designed as a sealing element, engages without interruptions or with interruptions, preferably without interruptions, in the layer along the extent of the circumferential edge region of the layer, and/or the layer, preferably the at least one element of the layer which is preferably designed as a sealing element, engages without interruptions or with interruptions, preferably without interruptions, in the housing along the extent of the circumferential edge region of the housing. The embodiments in which the at least one element of the housing and/or of the layer is designed without interruptions are particularly advantageous. By virtue of the circumferential design of the element, an enclosed space, which is arranged between at least the layer and the housing and into which no contaminants, e.g. liquids or solids, can enter, is formed at least by the layer and the housing, or at least by the rear side of the layer and the inner side of the housing. This is advantageous, in particular, if the layer is provided for the purpose of guiding light since light guidance within the layer is disrupted by any contaminants, particularly on the rear side of the layer. It is also possible, for example, for the enclosed space to be formed by the housing, the layer and, in addition, by the two-dimensionally extending decorative element or some other part of the component. Even more advantageous are the embodiments in which the at least one element of the housing and/or of the layer is designed without interruptions and the housing engages in the edge region of the layer and/or the layer engages in the edge region of the housing. These embodiments have particularly large enclosed spaces. The enclosed space is preferably at least one partial region of the gap arranged between the rear side of the layer and the inner side of the housing.

According to a development of the invention, the at least one layer has at least one first layer and one second layer, which are preferably arranged one above the other. In the following description, the first and the second layer are used to show how two directly adjacent layers of an arrangement of at least two layers, preferably arranged one above the other, are preferably connected to one another. In the case of the first layer and of the second layer, the first layer engages, e.g. via at least one element, preferably via at least one sealing element, in at least one recess arranged in the second layer, and/or the second layer engages, e.g. via at least one element, preferably via at least one sealing element, in at least one recess arranged in the first layer. If, for example, the at least one layer has a third layer in addition to the first layer and the second layer, then, in a first case, for example, the third layer engages, e.g. via at least one element, preferably via at least one sealing element, in at least one recess arranged in the first layer, and/or the first layer engages, e.g. via at least one element, preferably via at least one sealing element, in at least one recess arranged in the third layer. In a second preferred case, in which the at least one layer has a third layer, for example, in addition to the first layer and the second layer, the third layer engages, e.g. via at least one element, preferably via at least one sealing element, in at least one recess arranged in the second layer, for example, and/or the third layer engages, e.g. via at least one element, preferably via at least one sealing element, in at least one recess arranged in the second layer. In this way, as described by way of example with reference to the first, second and third layers, two or more layers can be connected to one another, in particular stacked one above the other and connected to one another. Moreover, this reduces the risk that the stacked layers can move relative to one another, in particular horizontally relative to one another. Such an arrangement reduces the risk of noise emissions by the component. Moreover, such an arrangement is conducive to assembly. Said element, preferably sealing element, of the layer is square, triangular or of any other desired shape in cross section, for example. The element preferably has an undercut. This offers the advantage that the layers are fastened particularly well to one another.

The layer which engages in a further layer is preferably produced from a first material, which has a greater hardness than the first material from which the further layer is produced. Thus, for example, the material of the first layer has a greater hardness than the material of the second layer or the material of the second layer has a greater hardness than the material of the first layer. This offers the advantage that the layer can engage in the further layer by the material of the layer displacing and/or compressing and/or deforming, preferably elastically deforming, the material of the further layer. Owing to the greater hardness of the layer in comparison with the hardness of the further layer, at least one recess is thus generated in the further layer by the layer as the layer and the further layer are joined, into which recess the layer then simultaneously engages during the joining process. Once the layer and the further layer have been joined, the further layer fits particularly snugly against that region of the layer which engages in the further layer by virtue of the lower hardness of said further layer in comparison with the hardness of the layer, and thus particularly good, at least partial sealing of any space or gap between the front side of the layer and the rear side of the further layer or between the rear side of the layer and the front side of the further layer is possible. Moreover, the layer and the further layer are thereby particularly well fastened to one another. Particularly good sealing and fastening can be achieved if the material of the further layer is deformed, in particular elastically deformed, by the material of the layer. Of course, it is also possible for at least one recess arranged in the layer and/or in the further layer to be a pre-produced recess.

A gap, in particular an air-filled gap, is preferably arranged between the first layer and the second layer. This gap is advantageous, in particular, if the first layer and/or the second layer is/are provided for the purpose of guiding light, which is preferably provided for back-lighting the back side of the two-dimensionally extending decorative element.

The first layer, preferably the at least one element of the first layer which is preferably designed as a sealing element, preferably engages without interruptions or with interruptions, preferably without interruptions, in the second layer, and/or the second layer, preferably the at least one element of the second layer which is preferably designed as a sealing element, engages without interruptions or with interruptions, preferably without interruptions, in the first layer. The first layer and/or the second layer preferably has/have a circumferential edge region, wherein the first layer, preferably the at least one element of the housing which is preferably designed as a sealing element, engages without interruptions or with interruptions, preferably without interruptions, in the second layer along the extent of the circumferential edge region of the second layer, and/or the second layer, preferably the at least one element of the second layer which is preferably designed as a sealing element, engages without interruptions or with interruptions, preferably without interruptions, in the first layer along the extent of the circumferential edge region of the first layer. The embodiments in which the at least one element of the first layer and/or of the second layer is designed without interruptions are particularly advantageous. By virtue of the circumferential design of the element, an enclosed space, which is arranged between the first layer and the second layer and into which no contaminants, e.g. liquids or solids, can enter, is formed by the first layer and the second layer. This is advantageous, in particular, if the first layer and/or the second layer is/are provided for the purpose of guiding light since light guidance within the first layer and/or second layer is disrupted by any contaminants, particularly between the first layer and the second layer. Even more advantageous are the embodiments in which the at least one element of the first layer and/or of the second layer is designed without interruptions and the first layer engages in the edge region of the second layer and/or the second layer engages in the edge region of the first layer. These embodiments have particularly large enclosed spaces. The enclosed space is preferably at least one partial region of the gap arranged between the first layer and the second layer.

According to a development of the invention, the component has at least one diffuser. At least one layer of the at least one layer is preferably designed as a diffuser. The diffuser causes light diffusion and, in particular, makes light more uniform. The at least one diffuser is preferably arranged between the back side of the two-dimensionally extending decorative element and the front side of at least one of the at least one layers. The diffuser is preferably molded onto the back side of the two-dimensionally extending decorative element, at least in some region or regions.

The diffuser is preferably secured on the housing. In this case, the housing is preferably produced from a second material, which is harder than the first material, from which the diffuser is produced. According to another embodiment, the diffuser is produced from a material which is harder than the material from which the housing is produced. The housing preferably engages, e.g. via at least one element, which is preferably designed as a sealing element, in at least one recess arranged in at least one diffuser of the at least one diffuser, and/or the diffuser engages, e.g. via at least one element, which is preferably designed as a sealing element, in at least one recess arranged in at least one housing of the at least one housing. This offers the advantage of reducing the risk that the housing can move relative to the diffuser or that the diffuser can move relative to the housing. This arrangement enables the component to be designed for low noise emissions. The element of the diffuser is square, triangular or of any other desired shape in cross section, for example. The element of the diffuser and/or of the housing preferably has an undercut. This offers the advantage that the diffuser and the housing are fastened particularly well to one another.

At least one layer of the at least one layer preferably engages, e.g. via at least one element, which is preferably designed as a sealing element, in at least one recess arranged in at least one diffuser of the at least one diffuser, and/or at least one diffuser of the at least one diffuser engages, e.g. via at least one element, which is preferably designed as a sealing element, in at least one recess arranged in at least one layer of the at least one layer. This offers the advantage of reducing the risk that the layer can move relative to the diffuser or that the diffuser can move relative to the layer. This arrangement enables the component to be designed for low noise emissions. The element of the diffuser and/or of the layer is square, triangular or of any other desired shape in cross section, for example. The element of the diffuser and/or of the layer preferably has an undercut. This offers the advantage that the layer and the diffuser are fastened particularly well to one another.

A gap, in particular an air-filled gap, is preferably arranged between the layer and the diffuser. This gap is advantageous, in particular, if the layer and/or the diffuser is/are provided for the purpose of guiding light, which is preferably provided for back-lighting the back side of the two-dimensionally extending decorative element.

The layer, preferably the at least one element of the layer which is preferably designed as a sealing element, preferably engages without interruptions or with interruptions, preferably without interruptions, in the diffuser, and/or the diffuser, preferably the at least one element of the diffuser which is preferably designed as a sealing element, engages without interruptions or with interruptions, preferably without interruptions, in the layer. The layer and/or the diffuser preferably has/have a circumferential edge region, wherein the layer, preferably the at least one element of the layer which is preferably designed as a sealing element, engages without interruptions or with interruptions, preferably without interruptions, in the diffuser along the extent of the circumferential edge region of the diffuser, and/or the diffuser, preferably the at least one element of the diffuser which is preferably designed as a sealing element, engages without interruptions or with interruptions, preferably without interruptions, in the layer along the extent of the circumferential edge region of the layer. The embodiments in which the at least one element of the layer and/or of the diffuser is designed without interruptions are particularly advantageous. By virtue of the circumferential design of the element, an enclosed space, which is arranged between the layer and the diffuser and into which no contaminants, e.g. liquids or solids, can enter, is formed by the layer and the diffuser. This is advantageous, in particular, if the layer and/or the diffuser is/are provided for the purpose of guiding light since light guidance within the layer and/or diffuser is disrupted by any contaminants, particularly between the layer and the diffuser. Even more advantageous are the embodiments in which the at least one element of the layer and/or of the diffuser is designed without interruptions and the layer engages in the edge region of the diffuser and/or the diffuser engages in the edge region of the layer. These embodiments have particularly large enclosed spaces. The enclosed space is preferably at least one partial region of the gap arranged between the layer and the diffuser.

If the layer and the diffuser are secured on one another, the layer can have a greater hardness than the diffuser, for example, or the diffuser can have a greater hardness than the layer, for example.

At least one diffuser of the at least one diffuser is preferably produced from glass or plastic, more preferably from plastic. The plastic preferably comprises at least one thermoplastic and/or at least one thermoset and/or at least one elastomer, more preferably at least one thermoplastic and/or at least one elastomer, even more preferably at least one elastomer. The thermoplastic is polymethylmethacrylate (PMMA), a PMMA block copolymer or polycarbonate (PC), for example. The elastomer is a silicone, for example, such as silicone rubber, for example.

The material, in particular the plastic, from which the diffuser is produced, optionally contains light-scattering particles. However, it is also possible for the diffuser to be produced from a cloudy material, in particular a cloudy plastic, e.g. a silicone. In this case, the cloudy material, e.g. the silicone, of the diffuser brings about the light scattering and it may be possible to dispense with the incorporation of light-scattering particles into the diffuser.

If the material from which the diffuser is produced comprises at least one thermoplastic and/or at least one thermoset, preferably at least one thermoplastic, the hardness of the material of the diffuser is preferably measured in accordance with DIN EN ISO 2039-1, June 2003.

If the material from which the diffuser is produced comprises at least one thermoplastic and/or at least one thermoset, preferably at least one thermoplastic, the ball impression hardness of the material from which the diffuser is produced is preferably in a range of from 10-200 N/mm$^2$, measured in accordance with DIN EN ISO 2039-1, June 2003.

If the material from which the diffuser is produced comprises at least one elastomer, e.g. silicone, in particular silicone rubber, the hardness of the material from which the diffuser is produced is preferably measured in accordance with DIN ISO 7619-1, February 2012.

If the material from which the diffuser is produced comprises at least one elastomer, e.g. silicone, in particular silicone rubber, the Shore A hardness of the material from which the diffuser is produced is preferably in a range of 5-90, measured in accordance with DIN ISO 7619-1, February 2012.

According to a development of the invention, the second material from which the housing is produced has a ball impression hardness in the range of 10-200 N/mm$^2$, and the material from which the diffuser is produced has a ball impression hardness in the range of 10-200 N/mm$^2$ or a Shore A hardness in the range of 5-90, preferably a Shore A hardness in the range of 5-90, wherein the ball impression hardness is measured in accordance with DIN EN ISO 2039-1, June 2003, and the Shore A hardness is measured in accordance with DIN ISO 7619-1, February 2012. If the second material, from which the housing is produced, has a greater hardness than the material from which the diffuser is produced, this offers the advantage that the housing can engage optimally in the diffuser and the diffuser can fit snugly in an optimum manner against the region of the housing which engages in the diffuser. Moreover, this embodiment is particularly conducive to assembly.

According to a development of the invention, the first material, from which the layer is produced, has a ball impression hardness in the range of 10-200 N/mm$^2$ or a Shore A hardness in the range of 5-90, preferably a Shore A hardness in the range of 5-90, and the material from which the diffuser is produced has a ball impression hardness in the range of 10-200 N/mm$^2$ or a Shore A hardness in the range of 5-90, preferably a Shore A hardness in the range of 5-90, wherein the ball impression hardness is measured in accordance with DIN EN ISO 2039-1, June 2003, and the Shore A hardness is measured in accordance with DIN ISO 7619-1, February 2012. If the first material, from which the layer is produced, has a greater hardness than the material from which the diffuser is produced, this offers the advantage that the layer can engage optimally in the diffuser and the diffuser can fit snugly in an optimum manner against the region of the layer which engages in the diffuser. Moreover, this embodiment is particularly conducive to assembly.

If the housing engages in the diffuser and/or the diffuser engages in the housing, then, according to one embodiment, at least one of the at least one recess arranged in the housing and/or at least one of the at least one recess arranged in the diffuser is a pre-produced recess.

The material from which the diffuser is produced can preferably be displaced by the second material, from which the housing is produced.

The material from which the diffuser is produced can preferably be compressed by the second material, from which the housing is produced.

The material from which the diffuser is produced can preferably be deformed, in particular elastically deformed, by the second material, from which the housing is produced.

If the layer engages in the diffuser and/or the diffuser engages in the layer, then, according to one embodiment, at least one of the at least one recess arranged in the layer and/or at least one of the at least one recess arranged in the diffuser is a pre-produced recess.

According to a preferred embodiment, the diffuser engages in the layer and/or the layer engages in the diffuser, wherein the layer is preferably produced from a translucent material, in particular from a transparent material.

The material from which the diffuser is produced can preferably be displaced by the first material, from which the layer is produced.

The material from which the diffuser is produced can preferably be compressed by the first material, from which the layer is produced.

The material from which the diffuser is produced can preferably be deformed, in particular elastically deformed, by the first material, from which the layer is produced.

In the case of a component which has the housing, a single layer and the diffuser, the hardness of the second material, from which the housing is produced, is preferably greater than the hardness of the first material, from which the layer is produced, wherein the hardness of the first material, from which the layer is produced, is greater than the hardness of the material from which the diffuser is produced. In the case of such a component, the diffuser is preferably arranged between the back side of the two-dimensionally extending decorative element and the front side of the layer, and the inner side of the housing faces the rear side of the layer. The layer is thus arranged between the diffuser and the housing. Such a component is particularly secure in terms of assembly.

In the case of a component which has the housing, the first layer and the second layer as well as the diffuser, the hardness of the second material, from which the housing is produced, is preferably greater than the hardness of the first material, from which the first layer is produced, the hardness of the first material, from which the first layer is produced, is greater than the hardness of the first material, from which the second layer is produced, and the hardness of the first material, from which the second layer is produced, is greater than the hardness of the material from which the diffuser is produced. In the case of such a preferred component, the diffuser is preferably arranged between the back side of the two-dimensionally extending decorative element and the front side of the second layer, and the first layer is preferably arranged between the rear side of the second layer and the inner side of the housing. A component with a structure of this kind is particularly secure in terms of assembly. Of course, it is possible, for example, for there to be a third layer instead of the diffuser in this component, wherein the hardness of the first material, from which the second layer is produced, is preferably greater than the hardness of the first material, from which the third layer is produced.

According to a development of the invention, the component comprises at least one lighting element for coupling light into at least one of the at least one layer and at least one electric power transmission element, which is designed as at least one connection cable, for example, for supplying the lighting element with electric power. The lighting element is preferably designed as a lighting element in the form of a point. This lighting element in the form of a point is a light emitting diode, for example. However, it is also possible for the lighting element to be designed as an electroluminescent foil, OLED or incandescent bulb, for example. Preferably, at least one lighting element, which is preferably designed as a light emitting diode, is secured on a carrier, e.g. a circuit board. The lighting element together with the carrier, the electric power transmission element for supplying the lighting element with electric power and, optionally, an electronic system preferably forms a lighting module.

According to a preferred embodiment, at least one lighting element or at least one lighting module is embedded at least partially, preferably completely, in the layer, which is preferably produced from a translucent plastic, in particular from a transparent plastic. This offers the advantage that the lighting element or the lighting module is protected from contaminants, such as liquids and solids, and mechanical effects. The lighting element or the lighting module is preferably embedded at least partially, preferably completely, in the layer by casting, in particular molding, plastic onto the lighting element or the lighting module. If the lighting element or the lighting module is completely embedded in the layer, only the electric power transmission element for supplying the lighting element with electric power, which is designed as a connection cable for example, protrudes from the layer. Thus, the layer has at least one passage through which the electric power transmission element extends, wherein the material of the layer rests directly in a sealing manner on the electric power transmission element.

The lighting element or the lighting module is preferably arranged between the back side of the two-dimensionally extending decorative element and the inner side of the housing. According to a preferred embodiment, the lighting element or the lighting module is arranged between the back side of the two-dimensionally extending decorative element and the front side of the layer. According to another preferred embodiment, the front side of the layer forms at least one trough, into which trough at least one lighting element or at least one lighting module is arranged in each case. The front side of the layer, which forms the trough, preferably faces the back side of the two-dimensionally extending decorative element. According to another preferred embodiment, the inner side of the housing forms at least one trough, into which trough at least one lighting element or at least one lighting module is arranged in each case. It is of course possible, according to another embodiment, for both the layer and the housing to have at least one trough, which are each suitable for the reception of at least one lighting element or at least one lighting module.

According to a development of the invention, the housing has at least one aperture, wherein the inner side of the housing forms an inlet opening of the aperture and the outer side of the housing forms an outlet opening of the aperture. The electric power transmission element preferably extends at least through the aperture from the inner side to the outer side of the housing. The material of the housing preferably rests directly in a sealing manner on a section of the electric power transmission element which is arranged in the aperture. This has the advantage that no contaminants, e.g. liquids or solids, can get into the component through the aperture. On the inner side, the housing preferably has at least one element, preferably a sealing element, which points in the direction of the rear side of the layer, which engages in at least one recess arranged in the layer and which preferably at least partially, preferably completely, surrounds the inlet opening of the aperture. The element, in particular the sealing element, is preferably arranged directly adjoining the inlet opening of the aperture. This offers the advantage that it is not possible, in particular, for any contaminants, such as liquids or solids, which get into the aperture to get between the rear side of the layer and the inner side of the housing. The element, in particular the sealing element, is preferably arranged underneath the lighting element or the lighting module. This offers the advantage that the risk that the element, in particular the sealing element, of the housing, which engages in the recess arranged in the layer, will disrupt any light propagating within the layer is reduced. If the component has a carrier, e.g. a circuit board, with a front side and a back side, for example, wherein the front side of the carrier faces the back side of the two-dimensionally extending decorative element and wherein the lighting element is arranged on the front side of the carrier, the element, in particular the sealing element, is preferably arranged in the region of the back side of the carrier and preferably underneath the back side of the carrier. The risk that any light coupled into the layer by the lighting element or by the lighting module will be disrupted by the element, in particular by the sealing element, which engages in the layer, as said light propagates in the layer is reduced.

The at least one element, preferably the at least one sealing element, of the housing which engages in the layer preferably has an outer, in particular outermost, edge and an inner, in particular innermost, edge, in a plan view of the inner side of the housing, wherein the outer, more preferably the outermost, edge preferably faces the back side of the two-dimensionally extending decorative element, and wherein at least one lighting element has a light emitting surface, which is arranged in such a way relative to the inner, preferably innermost, edge that the light emitted by the light emitting surface is radiated into a region of the layer which extends away from the inner, preferably innermost, edge in a direction away from the outer, preferably outermost, edge. This offers the advantage that the light emitted by the light emitting surface of the lighting element, coupled into the layer and propagating in the layer is not disrupted by the element, in particular the sealing element.

According to a development of the invention, the housing is secured on the two-dimensionally extending decorative element, in particular on the back side of the two-dimensionally extending decorative element.

According to a development of the invention, the housing is secured on the diffuser.

According to a development of the invention, the housing forms a back wall of the component on an opposite side of the component from the visible side of the two-dimensionally extending decorative element, wherein the back wall preferably forms a back side of the component, and wherein the housing preferably forms a side wall of the component, preferably a circumferential side wall, which is arranged between the visible side of the two-dimensionally extending decorative element and the back side of the component.

According to a development of the invention, the two-dimensionally extending decorative element is of transparent or opaque design, preferably being of transparent design. If the two-dimensionally extending decorative element is of transparent design, the two-dimensionally extending decorative element is produced from a transparent plastic, for example, or the two-dimensionally extending decorative element is produced from an opaque material which has at least one aperture through which light can pass through the two-dimensionally extending decorative element. The opaque material is metal or plastic, for example.

According to a development of the invention, at least one foil is applied to the back side of the two-dimensionally extending decorative element. The foil is preferably of transparent design. The foil can be designed as a diffuser, for example. Of course, the foil can also be of opaque design. If the two-dimensionally extending decorative element has at least one aperture, the foil preferably engages in at least one aperture.

According to a development of the invention, the visible side of the two-dimensionally extending decorative element at least partially, preferably completely, forms a visible side of the component, especially if the component is in the assembled state.

The component is preferably designed as a trim part or as an operator control element, e.g. a button, particularly preferably as a foot plate or running board of a vehicle. The vehicle is preferably a motor vehicle and, particularly preferably, a road vehicle.

The component can be provided in the interior and/or on the exterior of the vehicle. However, it is also possible, for example, for the component to be designed as a trim part or an operator control element of a household appliance, e.g. of a refrigerator, of a steamer, of a washing machine, of an oven, of a cooker, of a dishwasher or of a piece of furniture.

A method for producing a component, in particular a component as specified above, is furthermore indicated, having the following steps:
  providing at least one layer having a front side and a rear side;
  providing at least one housing having an inner side and an outer side;
  joining the layer and the housing in such a way that the housing engages in at least one recess arranged in the layer and/or the layer engages in at least one recess arranged in the housing.

According to a development of the invention, a two-dimensionally extending decorative element having a visible side and a back side is arranged in such a way that the back side of the two-dimensionally extending decorative element faces the front side of at least one of the at least one layer.

According to a development of the invention, at least one diffuser is arranged in such a way between the back side of the two-dimensionally extending decorative element and the front side of at least one of the at least one layer that the diffuser preferably engages in the front side of at least one of the at least one layer and/or wherein at least one of the at least one layer preferably engages in the diffuser. According to a preferred embodiment, the first material, from which the layer is produced, can be displaced and/or compressed and/or deformed, in particular elastically deformed, by the material from which the diffuser is produced. According to another preferred embodiment, the material from which the diffuser is produced can be displaced and/or compressed and/or deformed, in particular elastically deformed, by the first material, from which the layer is produced. The diffuser is preferably produced by casting, particularly preferably molding, plastic onto the back side of the two-dimensionally extending decorative element.

According to a development of the invention, the first material, from which the layer is produced, can be displaced and/or compressed and/or deformed, in particular elastically deformed, by the second material, from which the housing is produced.

According to a development of the invention, the second material, from which the housing is produced, can be displaced and/or compressed and/or deformed, in particular elastically deformed, by the first material, from which the layer is produced.

According to a development of the invention, at least one of the at least one recess arranged in the layer is formed during the joining of the layer and the housing, wherein, during joining, the housing preferably engages simultaneously in the recess formed in the layer, preferably via at least one element of the housing, which is preferably designed as a sealing element.

According to a development of the invention, at least one of the at least one recess arranged in the housing is formed during the joining of the layer and the housing, wherein, during joining, the layer preferably engages simultaneously in the recess formed in the housing, preferably via at least one element of the layer, which is preferably designed as a sealing element.

According to a development of the invention, at least one lighting element and/or at least one lighting module is arranged in such a way relative to at least one of the at least one layer that light from the lighting element and/or from the lighting module can be coupled into at least one of the at least one layer. The lighting element and/or lighting module is preferably embedded at least partially, preferably completely, in at least one of the at least one layer, preferably by encapsulating the lighting element and/or lighting module, in particular with plastic.

BRIEF DESCRIPTION OF THE DRAWINGS

Preferred embodiments of the invention are described below with reference to the drawings, which are purely for the sake of explanation and should not be interpreted restrictively. In the drawings:

FIG. 1 shows schematically a longitudinal section through a component according to the invention along the line I-I in FIG. 3;

FIG. 2 shows schematically a plan view of a cross section along the line II-II through the component shown in FIG. 1;

DESCRIPTION OF PREFERRED EMBODIMENTS

Figure 3:
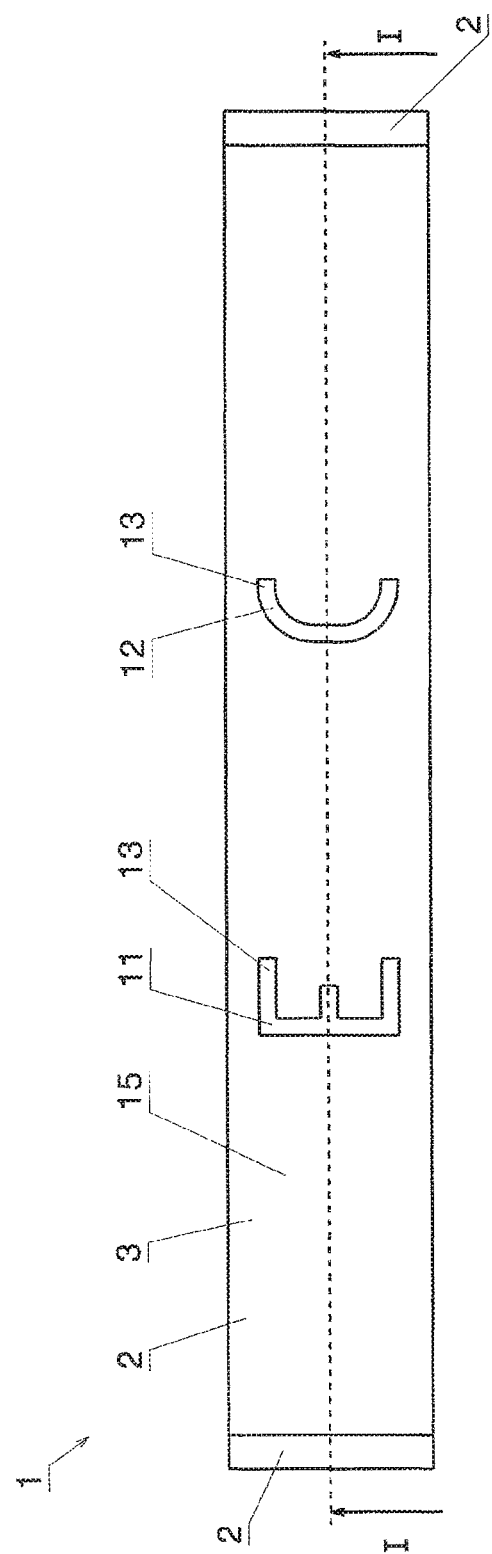
FIG. 3 shows schematically a plan view of a visible side of the component shown in FIG. 1.

FIG. 1 shows schematically a longitudinal section through a component 1 according to the invention along the line I-I in FIG. 3. In the present case, the component 1 is designed as a trim part. The component 1 according to the invention comprises a two-dimensionally extending decorative element 2 having a visible side 3 and a back side 4. The two-dimensionally extending decorative element 2 is produced from an opaque metal or from an opaque plastic or from a translucent, in particular transparent, plastic, for example. The fact that the decorative element 2 is "two-dimensionally extending" means that, as is apparent in FIGS. 1 and 3, the decorative element 2 is of significantly larger dimensions in two dimensions, in particular many times larger, than in a third dimension, which extends perpendicularly to the extent of the surface of the visible side 3 of the decorative element 2. As is apparent in FIGS. 1 and 3, the two-dimensionally extending decorative element 2 is designed as a strip. The two-dimensionally extending decorative element 2 has a first aperture 11 and a second aperture 12 (FIG. 1). As is apparent in FIG. 3, aperture 11 forms a letter E when seen in plan view of the visible side 3 of the two-dimensionally extending decorative element 2, and aperture 12 forms a letter C when seen in plan view of the visible side 3 of the two-dimensionally extending decorative element 2. The indicated number of apertures and the two letters indicated are only illustrative. In principle, the two-dimensionally extending decorative element 2 can have at least one aperture which forms at least one symbol, e.g. a letter.

A single layer 5 having a front side 6 and a rear side 7 is arranged on the back side 4 of the two-dimensionally extending decorative element 2. The layer 5 is preferably produced from a translucent, in particular transparent, first material, wherein the front side 6 of the layer 5 faces the back side 4 of the two-dimensionally extending decorative element 2. A translucent, in particular transparent, foil 13, which is secured on the back side 4 of the two-dimensionally extending decorative element 2 and which engages in the apertures 11 and 12, is arranged between the back side 4 of the two-dimensionally extending decorative element 2 and the front side 6 of the layer 5. As is apparent in FIG. 1, the foil 13 ends flush with the visible side 3 of the two-dimensionally extending decorative element 2 and thus prevents contaminants, such as solids or liquids, from being able to get into the component 1 via the apertures 11 and 12 in the two-dimensionally extending decorative element 2. If desired, the foil 13 can be designed as a diffuser. As is apparent in FIG. 1, the layer 5 is secured on the back side 4 of the two-dimensionally extending decorative element 2 and of the foil 13 and engages in the foil 13 underneath the apertures 11 and 12. Of course, the layer 5 can be designed as a diffuser as an alternative to the foil 13 or in addition to the foil 13.

As can be seen in FIG. 1, a lighting module 18 is completely embedded in the layer 5. The layer 5 is preferably produced by means of a casting process, more preferably by means of an injection molding process. The lighting module 18 comprises a carrier 19, designed as a circuit board, having a front side 21 and a back side 60, lighting elements 20, which are designed as light emitting diodes and are arranged on the front side 21 of the carrier 19, and an electric power transmission element 22, which comprises two connection cables, for supplying the lighting elements 20 with electric power. If required, the lighting module 20 additionally comprises an electronic system. Each of the two connection cables mentioned extends through a passage 23 arranged in the layer 5, wherein the material of the layer 5 rests directly in a sealing manner on the connection cables. When the lighting elements 20 are emitting light, the light propagates within the layer 5 and exits the component 1 via the foil 13 and the apertures 11 and 12 or is emitted from a visible side 15 of the component 1 or from the visible side 3 of the two-dimensionally extending decorative element 2.

Furthermore, the component 1 has a housing 8 having an inner side 9 and an outer side 10, wherein the inner side 9 of the housing 8 faces the rear side 7 of the layer 5. As can be seen in FIG. 1, the housing 8 forms a back wall 62, a back side 63 and a circumferential side wall 64 of the component 1. As is apparent in FIG. 1, the foil 13, together with the visible side 3 of the two-dimensionally extending decorative element 2 and a partial region 14 of the outer side 10 of the housing 8, thus forms the visible side 15 of the component 1. It can furthermore be seen in FIG. 1 that the housing 8 forms a back side 57 of the component 1, which lies opposite the visible side 15 of the component 1. The housing 8 is preferably produced from an opaque second material. This offers the advantage that light emitted by the lighting elements 20 cannot emerge from the component 1 via the housing 8. Arranged between the rear side 7 of the layer 5 and the inner side 9 of the housing 8 is a gap 24, in particular an air-filled gap 24, which enables light emitted by the lighting elements 20 to propagate within the layer 5, in particular by total reflection. The housing 8 is secured in a sealed manner on a circumferential end face 25 of the two-dimensionally extending decorative element 2, thus preventing contaminants, such as solids or liquids, from getting into the component 1 between the two-dimensionally extending decorative element 2 and the housing 8. Moreover, the housing 8 is secured on the layer 5 by virtue of the fact that the housing 8 engages in a recess 26 arranged in the layer 5 by means of a sealing element 17, which points in the direction of the rear side 7 of the layer 5, is designed as an elevation and is parabolic in cross section. The inner side 9 of the housing 8, the rear side 7 of the layer 5 and the back side 4 of the two-dimensionally extending decorative element 2 thus jointly form an enclosed space 59. The space 59 thus forms a partial region of the gap 24. As is apparent in FIG. 2, the sealing element 17 is of circular design in plan view.

As is apparent in FIG. 1, the housing 8 has a main body 31 and the sealing element 17, wherein the main body 31 and the sealing element 17 of the housing 8 are connected integrally to one another. The main body 31 and the sealing element 17 are thus produced from the same material. However, the housing 8 can also be of two-piece design, for example. In this case, the main body 31 is produced from a material which is different from the material from which the sealing element 17 is produced, for example. In the case of a two-piece housing 8, it is also possible, however, for the main body 31 and the sealing element 17 to be produced from the same material. In this case, the main body 31 is connected materially to the sealing element 17, for example. Moreover, the component 1 has at least two fastening elements 32, which are connected integrally to the main body 31 of the housing 8. The fastening elements 32 are used to fasten the component 1 on a surface (not shown), e.g. a surface of a vehicle. Such a part of the component 1, comprising the housing 8, having the main body 31 and the sealing element 17, as well as the fastening elements 32, can be produced in a particularly simple and low-cost manner.

As can be seen in FIG. 1, the electric power transmission element 22 extending through the layer 5 furthermore extends through an aperture 27 in the housing 8. The inner side 9 of the housing 8 or the sealing element 17 forms an inlet opening 28 of the aperture 27. The outlet opening 29 of the aperture 27, via which the electric power transmission element 22 leaves the component 1, is formed by the outer side 10 of the housing 8. FIG. 2 shows a cross section through the two connection cables, which jointly form the electric power transmission element 22 and which project into the aperture 27.

The housing 8 is produced from plastic, metal, glass or ceramics, for example. The housing 8 is preferably produced from plastic. The plastic preferably comprises at least one thermoplastic and/or at least one thermoset, more preferably at least one thermoplastic. The thermoplastic is acrylonitrile butadiene styrene (ABS), polyamide (PA), polymethylmethacrylate (PMMA), polycarbonate (PC), polyethylene terephthalate (PET), polyethylene (PE), polypropylene (PP), polystyrene (PS), polyetheretherketone (PEEK) or polyvinylchloride (PVC), for example. If the housing 8 is produced from a plastic which comprises at least one thermoplastic, the hardness of the housing 8 or the hardness of the material from which the housing 8 is produced is preferably measured in accordance with DIN EN ISO 2039-1, June 2003. If the housing 8 is produced from a plastic which comprises at least one thermoplastic, the housing 8 preferably has a ball impression hardness in the range of 10-200 N/mm$^2$, measured in accordance with DTN EN ISO 2039-1, June 2003. Depending on requirements, the material from which the housing 8 is produced, e.g. plastic, can optionally also contain additives, e.g. reinforcing materials.

The layer 5 is produced from plastic or glass, preferably from plastic, for example. The plastic preferably comprises at least one thermoplastic and/or at least one thermoset and/or at least one elastomer, more preferably at least one thermoplastic and/or at least one elastomer, even more preferably at least one elastomer. The thermoplastic is acrylonitrile butadiene styrene (ABS), polyamide (PA), polymethylmethacrylate (PMMA), in particular a PMMA block copolymer, polycarbonate (PC), polyethylene terephthalate (PET), polyethylene (PE), polypropylene (PP), polystyrene (PS), polyetheretherketone (PEEK) or polyvinylchloride (PVC), for example. The elastomer is silicone, for example, in particular silicone rubber. If the layer 5 is produced from plastic or glass, for example, it can contain additives if desired.

If the layer 5 is produced from plastic and the plastic comprises at least one thermoplastic and/or at least one thermoset, preferably at least one thermoplastic, the hardness of the plastic of the layer 5 is preferably measured in accordance with DIN EN ISO 2039-1, June 2003. The plastic of the layer 5, comprising at least one thermoplastic and/or at least one thermoset, preferably comprising at least one thermoplastic, preferably has a ball impression hardness, measured in accordance with DIN EN ISO 2039-1, June 2003, in the range of 10-200 N/mm$^2$.

If the layer 5 is produced from plastic and the plastic comprises at least one elastomer, preferably silicone, more preferably silicone rubber, the hardness of the plastic of the layer 5 is preferably measured in accordance with DIN ISO 7619-1, February 2012. The plastic of the layer 5, comprising at least one elastomer, preferably has a Shore A hardness, measured in accordance with DIN ISO 7619-1, February 2012, in the range of 5-90. The material from which the housing 8 is produced has a hardness which is preferably greater than the hardness of the material from which the layer 5 is produced.

Once the housing 8 and the layer 5 have been joined during the production of the component 1, then, in the case of a greater hardness of the material of the housing 8 in comparison with the hardness of the material of the layer 5, a circular recess 26 is generated in the layer 5 by the sealing element 17 of the housing 8, into which recess the circular sealing element 17 engages simultaneously or during the joining process. During the joining of the housing 8 and the layer 5, the material of the layer 5 is preferably displaced and/or compressed and/or deformed, in particular elastically deformed, by the material of the housing 8. The housing 8 and the layer 5 are thereby fastened well to one another. The housing 8 and the layer 5 are fastened particularly well to one another if the material of the layer 5 is deformed, in particular elastically deformed, by the material of the housing 8.

If the hardness of the material of the housing 8 is greater than the hardness of the material of the layer 5, the material of the layer 5 fits particularly snugly against the material of the housing 8 or against a surface 30 of a section 33 of the sealing element 17 which engages in the recess 26, and the shape of the engaging section 33 of the sealing element 17 thus corresponds to the shape of the recess 26.

The engagement of the circular sealing element 17 in the layer 5, the snug fitting of the layer 5 against the housing 8 and the fact that the sealing element 17 forms the inlet opening 28 of the aperture 27 have the advantage that any contaminants, such as solids or liquids, cannot get into the space 59 via the aperture 27 in the housing 8 and thus cannot impair the ability to function of the component 1, in particular light guidance within the layer 5. Moreover, the engagement of the housing 8 in the layer 5 makes the component 1 more stable, and movement of the layer 5 relative to the housing 8 or movement of the housing 8 relative to the layer 5 is therefore prevented. By means of this arrangement, the risk of the generation of rattling noises by the component 1 is thus reduced, and the component 1 thus has lower noise emissions. The functional reliability of the component 1 is further increased by virtue of the fact that the lighting module 18 is embedded completely in the layer 5. As is evident in FIG. 1, only the electric power transmission element 22, comprising two connection cables, protrudes from the layer 5. Any contaminants, e.g. solids or liquids, can thus not reach the lighting module 18 and impair the lighting module 18 as such or the light emission of the lighting module 18 into the layer 5. Moreover, the construction of the component 1 means that it can be produced in a simple and low-cost manner. The susceptibility of the component 1 to contaminants, e.g. solids or liquids, can be further reduced if the material of the housing 8 rests directly in a sealing manner on a section of the electric power transmission element 22 which extends through the housing 8.

Furthermore, the selection of the hardness of the material from which the layer 5 is produced relative to the hardness of the material from which the housing 8 is produced makes it possible to set the gap 24, or the height S of the gap 24, and thus also the height of the space 59, in a defined manner during the joining of the layer 5 and the housing 8, in which process the housing 8 engages in the layer 5. This defined setting of the gap 24 or this defined setting of the space 59 is advantageous, in particular if the layer 5 is provided for light guidance and is thus produced from a translucent, in particular transparent, material. The height S is in the range of 0.01 to 0.1 millimeters, for example. The height S of the gap 24 refers to the extent of the gap 24 in the direction perpendicular to the inner side 9 of the housing 8.

The layer 5 has a thickness D in the range of 0.5 millimeters-3 millimeters, preferably in the range of 0.5 millimeters to 2.6 millimeters, for example. The sealing element 17 has a height H in the range of 0.2 millimeters to 0.4 millimeters, for example. The thickness D of the layer 5 refers to the extent of the thickness D in the direction perpendicular to the rear side 7 of the layer 5. The height H of the sealing element 17 refers to the extent of the height H in a direction perpendicular to the inner side 9 of the housing 8. The dimensions "thickness D", "height H", "height S" and the ratios of the dimensions "thickness D", "height H", "height S" to one another are selected in accordance with the desired properties of the component 1.

The component 1 can be produced as follows, for example: in a first step, the two-dimensionally extending decorative element 2 is made available and provided with the apertures 11 and 12, e.g. by means of punching or by means of a laser. After this, the two-dimensionally extending decorative element 2 provided with the apertures 11 and 12 is pre-shaped, e.g. by means of a deep drawing process. The foil 13 is then secured, e.g. by means of adhesive, to the back side 4 of the pre-shaped two-dimensionally extending decorative element 2 provided with the apertures 11 and 12. The two-dimensionally extending decorative element 2 provided with the foil 13 is then placed in a casting mold (not shown), in particular an injection mold, and the lighting module 18 is arranged and fixed behind the foil 13, or underneath the foil 13, thus ensuring that the lighting module 18 is not displaced by the casting/molding pressure during the casting/molding process of the layer 5 which then follows. A translucent, preferably transparent, plastic is then cast behind, in particular injected behind, the back side 4 of the two-dimensionally extending decorative element 2 and the foil 13, for example, with the result, on the one hand, that a partial region of the foil 13 is pressed into the apertures 11 and 12 and, on the other hand, that the lighting module 18 is embedded completely in the plastic forming the layer 5, with the result that only the electric power transmission element 22, comprising two connection cables, then protrudes from the layer 5. If desired, the two-dimensionally extending decorative element 2 can be further deformed by the casting/molding pressure. Of course, it is also possible for casting/molding behind the two-dimensionally extending decorative element 2 to take place while said element is still undeformed and for said element to be deformed only during the formation of the layer 5, or during the process of casting/molding behind said element. The pre-produced housing 8 is then secured on the end face 25 of the two-dimensionally extending decorative element 3. The housing 8 is furthermore secured on the two-dimensionally extending decorative element 2 by virtue of the fact that the sealing element 17 of the housing 8 engages in the layer 5. During the securing of the housing 8 on the two-dimensionally extending decorative element 2 as just described, the electric power transmission element 22 is passed out of the now finished component 1 via the aperture 27 in the housing 8.

Figure 4:
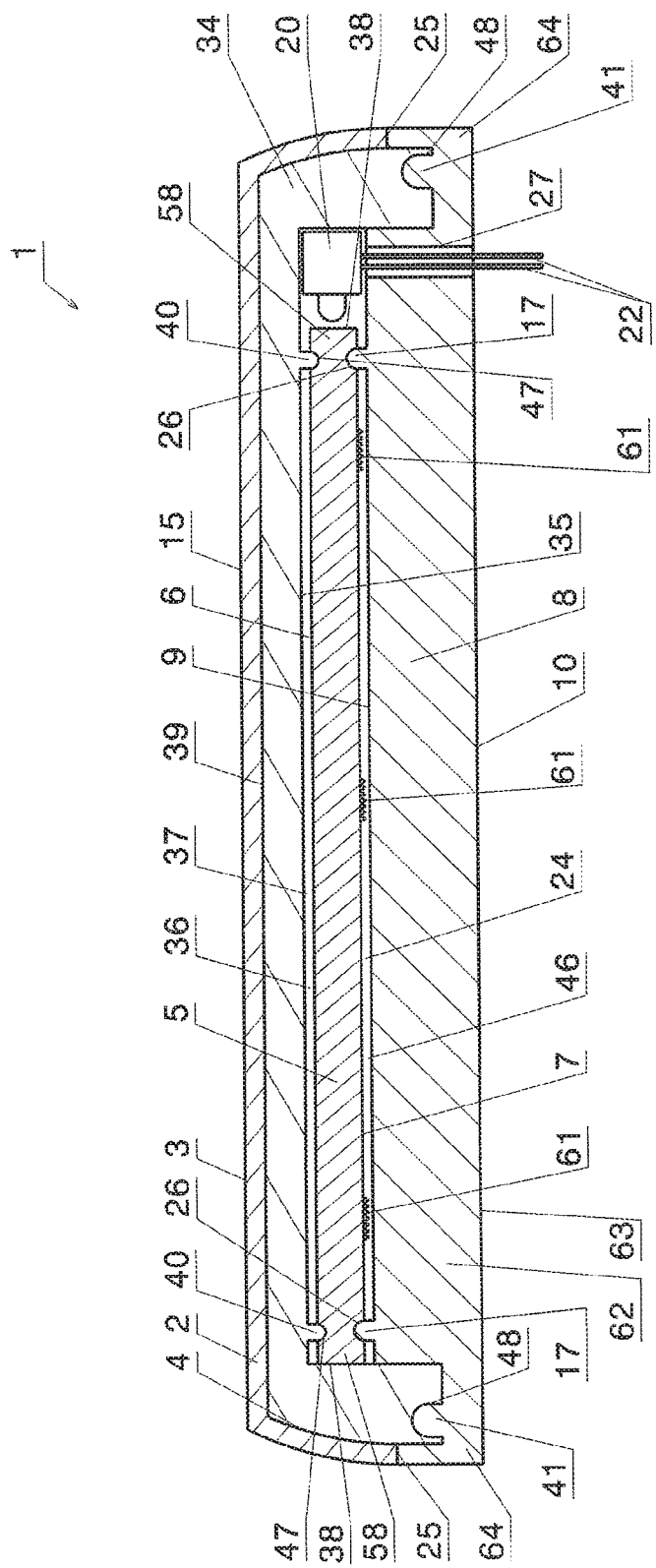
FIG. 4 shows schematically a longitudinal section through a first embodiment of a component according to the invention.

FIG. 4 shows schematically a longitudinal section through a first embodiment of a component according to the invention. The component 1 shown in FIG. 4 has a two-dimensionally extending decorative element 2 having a visible side 3 and a back side 4, which is manufactured from a translucent, in particular a transparent, plastic, for example. It is also possible, for example, for the two-dimensionally extending decorative element 2 to be produced from a translucent metal foil. A diffuser 34 having a front side 39 and a back side 35 is arranged on the back side 4 of the two-dimensionally extending decorative element 2. The diffuser 34 is preferably produced by casting, preferably molding, behind the back side 4 of the two-dimensionally extending decorative element 2. Arranged underneath the diffuser 34 is a layer 5 having a front side 6 and a rear side 7, which is of plate-shaped design, for example. The front side 6 of the layer 5 faces the back side 35 of the diffuser 34.

As can be seen in FIG. 4, there is a gap 36, which contains air for example, between the front side 6 of the layer 5 and the back side 35 of the diffuser 34. Furthermore, the diffuser 34 has a single circumferential sealing element 40, which is aligned in the direction of the front side 6 of the layer 5 and engages in a single recess in the layer 5. Since the sealing element 40 is of circumferential design, there is an enclosed space 37 between the front side 6 of the layer 5 and the back side 35 of the diffuser 34. The enclosed space 37 thus forms a partial region of the gap 36.

As is evident in FIG. 4, a preferably opaque housing 8 having an inner side 9 and an outer side 10 is arranged underneath the layer 5. A gap 24 is arranged between the inner side 9 of the housing 8 and the rear side 7 of the layer 5. A single circumferential sealing element 17 of the housing 8 engages in a recess 26 arranged in the layer 5 on the rear side 7 of the layer 5. The sealing element 17 thus engages in the layer 5 without interruptions along the extent of a circumferential edge region 58 of the layer 5. Since the sealing element 17 is of circumferential design, an enclosed space 46 is arranged between a rear side 7 of the layer 5 and the inner side 9 of the housing 8. The enclosed space 46 thus forms a partial region of the gap 24.

The housing 8, in turn, engages via a further circumferential sealing element 41 in a recess 48 in the diffuser 34, wherein the housing 8 is secured on the diffuser 34 by means of this engagement. In addition, the housing can be secured on a circumferential end face 25 of the two-dimensionally extending decorative element 2 if desired. An electric power transmission element 22, which comprises two connection cables, extends from a lighting element 20 to the outer side 10 of the housing 8 through an aperture 27 in the housing 8.

The layer 5 and the diffuser 34 are produced from silicone, in particular silicone rubber, or PMMA block copolymer, for example. If the layer 5 and the diffuser 34 are produced from silicone, in particular silicone rubber, the Shore A hardness of the layer 5 and of the diffuser 34 is preferably measured in accordance with DIN ISO 7619-1, February 2012. If the layer 5 and the diffuser 34 are produced from PMMA block copolymer, the hardness of the material of the layer 5 and the diffuser 34 is preferably measured in accordance with DIN EN ISO 2039-1, June 2003. The housing 8 is preferably produced from a plastic comprising at least one thermoplastic and/or at least one thermoset, preferably at least one thermoplastic. Possible thermosets for the production of the housing 8 are epoxy compounds, polyurethane compounds, phenol formaldehyde resins or polyester compounds, for example. Transparent thermosets, such as epoxy compounds or polyester compounds, can also be used for the production of the layer 5 and of the diffuser 34, for example. The hardness of the material from which the housing 8 is produced is preferably measured in accordance with DIN EN ISO 2039-1, June 2003.

The material from which the diffuser 34 is produced preferably has a Shore A hardness in the range of 5-90. The material from which the layer 5 is produced preferably has a Shore A hardness in the range of 5-90. The material from which the housing 8 is produced preferably has a hardness in the range of 10-200 N/mm$^2$.

The material from which the housing 8 is produced has a hardness which is greater than the hardness of the material from which the layer 5 and the diffuser 34 are produced. The material from which the diffuser 34 is produced is, in turn, harder than the material from which the layer 5 is produced. If the layer 5 and the diffuser 34 are produced from silicone, the silicone material from which the layer 5 is produced differs in composition from the silicone material from which the diffuser 34 is produced. Thus, in a first case, for example, the silicone material from which the diffuser 34 is produced is identical with the silicone material from which the layer 5 is produced, wherein the silicone material from which the diffuser 34 is produced additionally has light-scattering particles, for example, in comparison with the silicone material from which the layer 5 is produced. In a second case, it is possible, for example, for the silicone material from which the diffuser 34 is produced to be cloudy and thus to have the property of scattering light, whereas the silicone material from which the layer 5 is produced does not have any light-scattering effect and is thus of clear design, in particular having the clarity of glass. In this second case, the light-scattering effect of the diffuser 34 is thus not produced by light-scattering particles incorporated into the diffuser 34, for example, but is ensured exclusively by the silicone material from which the diffuser 34 is produced.

Once the layer 5 and the diffuser 34 are joined during the production of the component 1, the sealing element 40 of the diffuser 34 engages in the material of the layer 5 by virtue of the greater hardness of the material of the diffuser 34 in comparison with the hardness of the material of the layer 5.

During the joining of the housing 8, the layer 5 and the diffuser 34, the sealing element 41 of the housing 8 engages in the diffuser 34, and the sealing element 17 of the housing 8 engages in the layer 5. This engagement of the housing 8 in the diffuser 34 and the layer 5 takes place because the hardness of the material of the housing 8 is greater than the hardness of the material of the layer 5 and of the diffuser 34. The housing 8 is thus doubly secured by means of the sealing elements 17, 41.

The sealing element 40 of the diffuser 34 engages in the material of the layer 5, for example, by virtue of the fact that the sealing element 40 displaces the material of the layer 5, for example. However, it is also possible for the engagement of the sealing element 40 in the layer 5 to take place through the sealing element 40 compressing or deforming, in particular elastically deforming, the material of the housing 8, for example. The sealing element 17 of the housing 8 engages in the material of the layer 5, for example, through the sealing element 17 displacing, compressing or deforming, in particular elastically deforming, the material of the layer 5, for example. The sealing element 41 of the housing 8 engages in the material of the diffuser 34, for example, through the sealing element 41 displacing, compressing or deforming, in particular elastically deforming, the material of the diffuser 34, for example.

Arranged adjacent to a lateral surface 38 of the layer 5 is the lighting element 20, which is designed as a light emitting diode and is suitable for coupling light into the layer 5. The light propagates within the layer 5, in particular by total reflection, and leaves the layer 5 in a defined manner via a front side 6 of the layer 5 by virtue of light deflecting structures 61 arranged on the rear side 7 of the layer 5, and is then emitted from a visible side 15 of the component 1 via the diffuser 34 and the two-dimensionally extending decorative element 2. Of course, light deflecting structures 61 can also be provided on the front side 6 of the layer 5 (not shown). The diffuser 34 has the effect that the light radiated into the diffuser 34 from the layer 5 is emitted from the diffuser 34 via a front side 39 of the diffuser 34 while being made more uniform by the diffuser 34. No contaminants, e.g. solids or liquids, can enter the enclosed spaces 37 and 46, and optimum light guidance within the layer 5 and optimum coupling of light out of the layer 5 are thus ensured.

The engagement of the circumferential sealing element 17 and of the circumferential sealing element 41 of the housing 8 in the layer 5, and the engagement of the diffuser sealing element 40 of the diffuser 34 in the layer 5 have the advantage that any contaminants, such as solids or liquids, cannot get into the enclosed spaces 24 and 36 of the component 1, e.g. via the aperture 27 in the housing 8, and thus cannot disrupt the propagation of the light in the layer 5, for example.

Moreover, by virtue of the engagement of the housing 8 in the layer 5 and by virtue of the engagement of the diffuser 34 in the layer 5, the component 1 is of more stable design. Furthermore, the engagement prevents movement of the layer 5 relative to the housing 8 and movement of the housing B relative to the layer 5 as well as movement of the layer 5 relative to the diffuser 34 and movement of the diffuser 34 relative to the layer 5. The engagement of the sealing elements 17, 40 and 41 thus reduces the risk that rattling noises will be generated by the component 1, and the noise emissions of the component 1 are thus lower. Moreover, the component 1 can be produced in a simple and low-cost manner since the layer 5 now has only to be fitted onto the diffuser 34, and the housing 8 now has only to be fitted onto the layer 5 and the diffuser 34.

Through the selection of the hardness of the material from which the layer 5 is produced relative to the hardness of the material from which the housing 8 and the diffuser 34 are produced, it is furthermore possible to set the gap 24 in a defined manner during the joining of the layer 5 and the housing 8. Through the selection of the hardness of the material from which the layer 5 is produced relative to the hardness of the material from which the diffuser 34 are produced, a gap 36 between a back side 35 of the diffuser 34 and the front side 6 of the layer 5 can be set in a defined manner during the joining of the layer 5 and the diffuser 34. This defined setting of gap 24 and gap 36 is advantageous particularly if the layer 5 is provided for light guidance and is thus produced from a translucent material, in particular from a transparent material.

Figure 5:
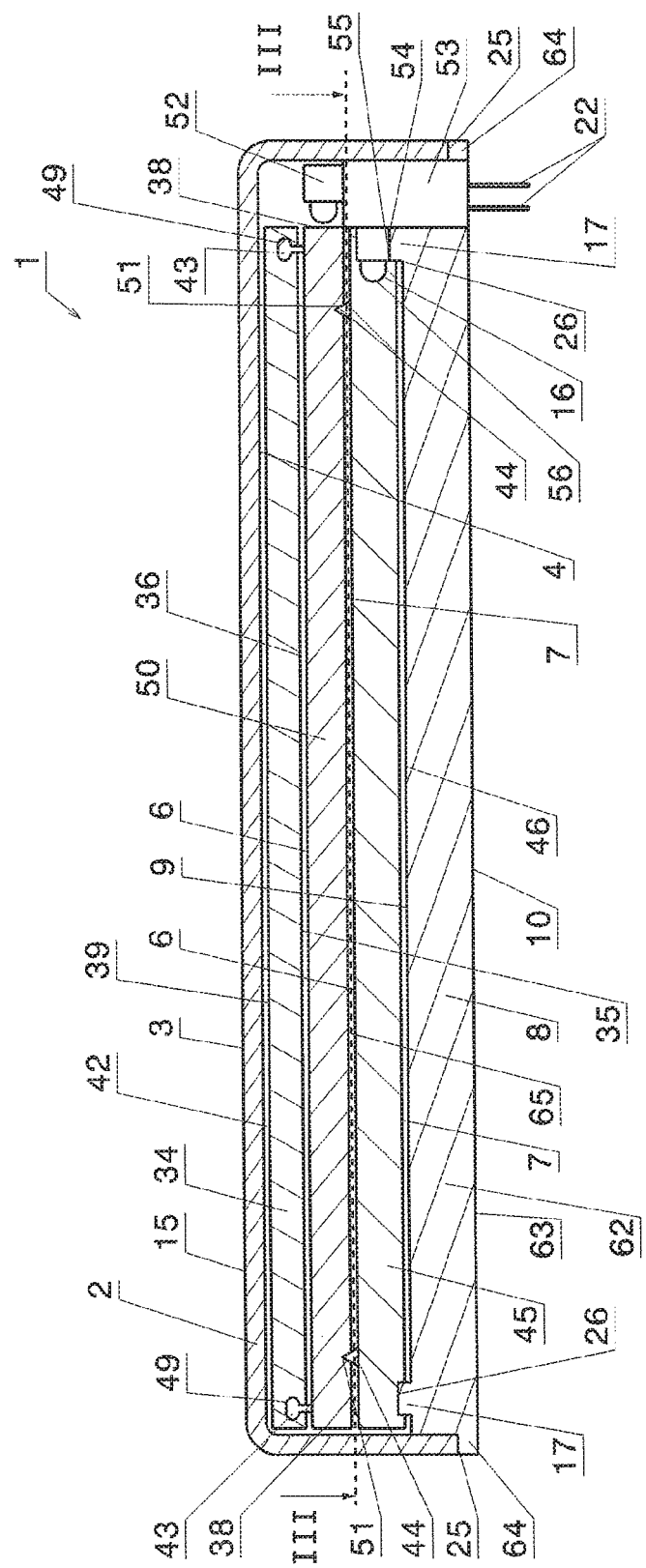
FIG. 5 shows schematically a longitudinal section through a second embodiment of a component according to the invention.

FIG. 5 shows schematically a longitudinal section through a second embodiment of a component according to the invention. The component 1 shown in FIG. 5 has a two-dimensionally extending decorative element 2 having a visible side 3 and a back side 4, which is manufactured from a translucent, in particular a transparent, plastic, for example. It is also possible, for example, for the two-dimensionally extending decorative element 2 to be produced from a translucent metal foil. A diffuser 34 having a front side 39 and a back side 35 is arranged on the back side 4 of the two-dimensionally extending decorative element 2. The front side 39 of the diffuser 34 faces the back side 4 of the two-dimensionally extending decorative element 2, and the back side 35 of the diffuser 34 faces a front side 6 of a first layer 50, which is arranged underneath the diffuser 34. The first layer 50 is produced from a translucent, in particular transparent, material and is used for guiding light. As is apparent in FIG. 5, a gap 42 is arranged between the back side 4 of the two-dimensionally extending decorative element 2 and the front side 39 of the diffuser 34, and there is a gap 36 between the back side 35 of the diffuser 34 and the front side 6 of the first layer 50. The first layer 50 has a single circumferential sealing element 43, which comprises an undercut and, as is apparent in FIG. 5, can be of mushroom-shaped design in cross section, for example. The undercut offers the advantage that the first layer 50 and the diffuser 34 are fastened particularly well to one another. The sealing element 43 engages in a recess 49 in the diffuser 34.

A second layer 45 having a front side 6 and a rear side 7 is arranged underneath the first layer 50, wherein there is a gap 65 between the front side 6 of the second layer 5 and the rear side 7 of the first layer 50. The second layer 45, in turn, is produced from a translucent, in particular transparent, material and is used for guiding light. The material of the first layer 50 and the material of the second layer 45 together form a group of first materials.

Figure 6:
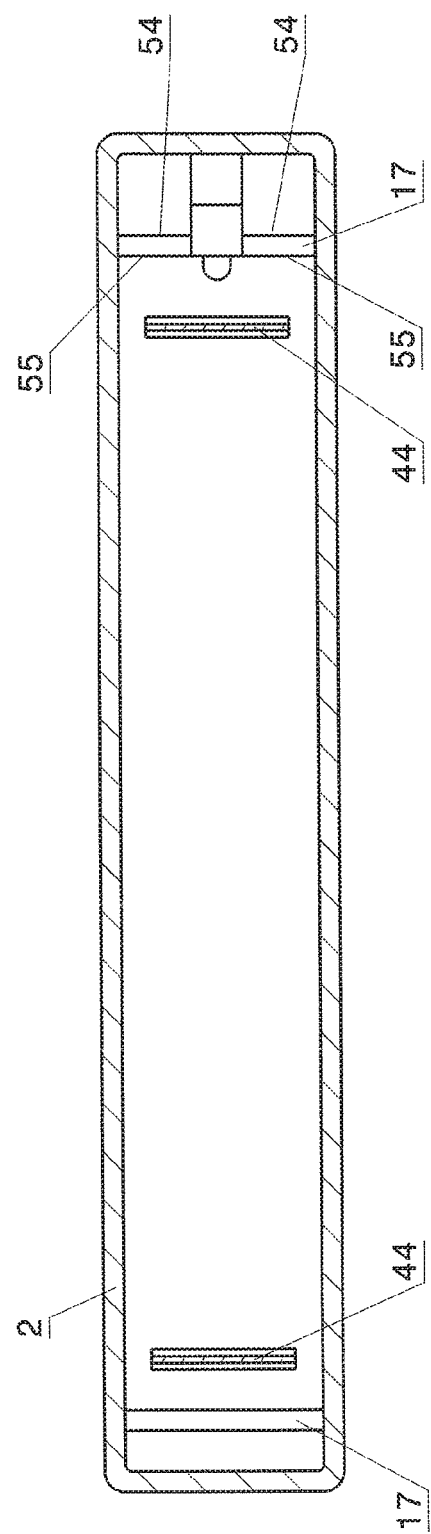
FIG. 6 shows schematically a plan view of a cross section along the line III-III through the component shown in FIG. 5.

Two sealing elements 44 of the second layer 45, which can be of triangular design in cross section, for example, as can be seen in FIG. 5, engage in the material of the first layer 50 or into a respective recess 51 in the first layer 50. FIG. 6 shows schematically a plan view of a cross section along the line III-III through the component shown in FIG. 5. From FIG. 6, it can be seen that the two sealing elements 44 lie parallel and opposite to one another and each extend over part of the width of the first layer 50.

Figure 7:
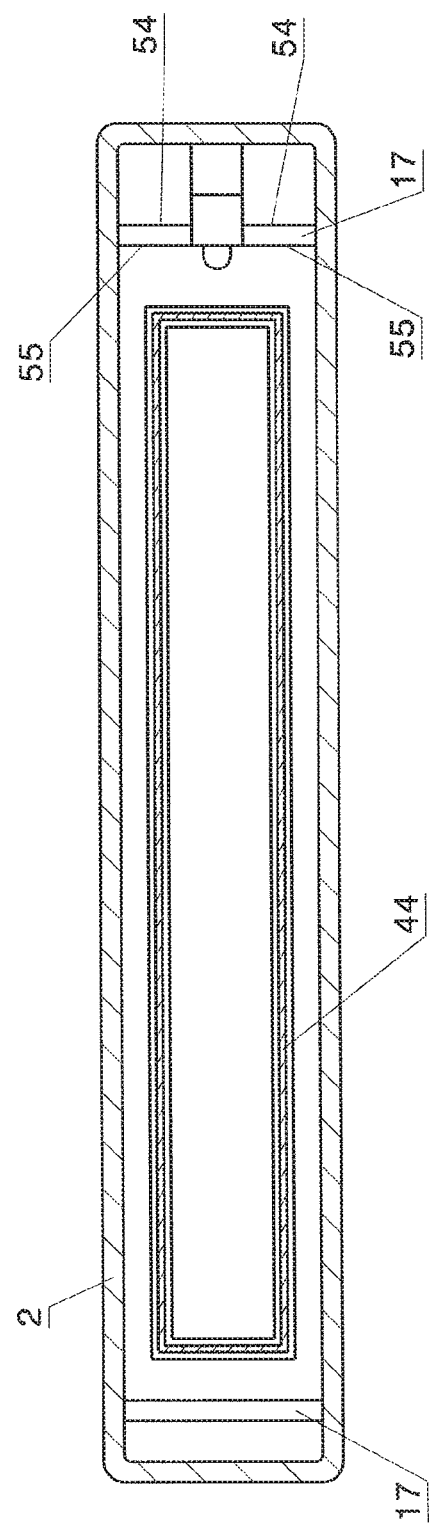
FIG. 7 shows schematically a plan view of a cross section along the line III-III through a first variant of the component shown in FIG. 5.
Figure 8:
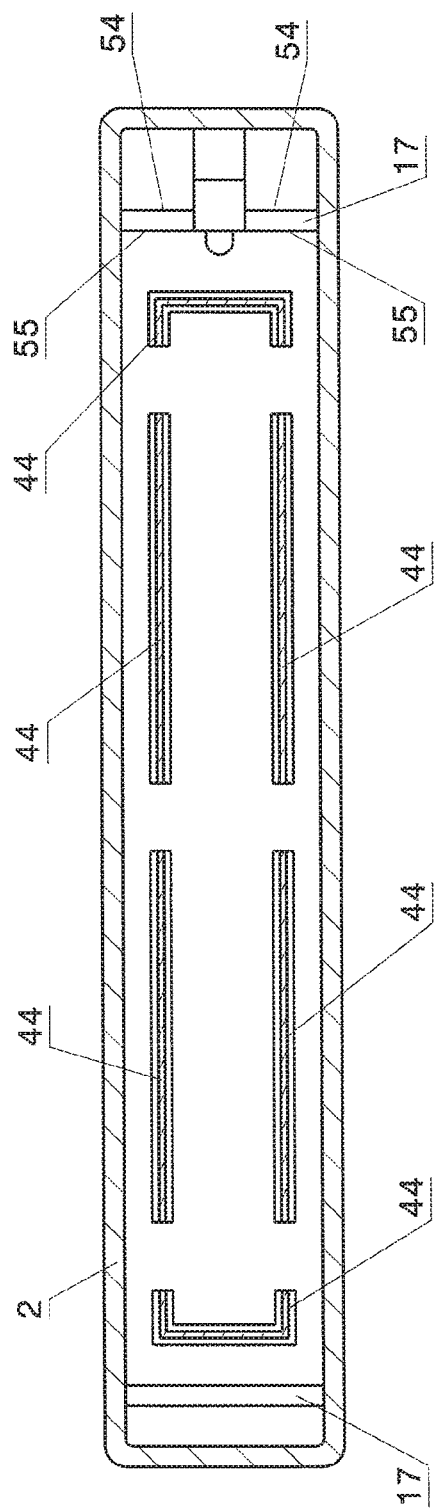
FIG. 8 shows schematically a plan view of a cross section along the line III-III through a second variant of the component shown in FIG. 5.

According to a first variant, the second layer 45, instead of having the two sealing elements 44, can have a single circumferential sealing element 44, which is illustrated in FIG. 7. FIG. 7 shows schematically a plan view of a cross section along the line III-III through a first variant of the component 1 shown in FIG. 5. According to a second variant, the first layer 50 can have a plurality of mutually spaced sealing elements 44, which together form a circumferential sealing element with interruptions. Said sealing elements 44 can be seen in FIG. 8, which FIG. 8 shows schematically a plan view of a cross section along the line III-III through a second variant of the component 1 shown in FIG. 5. The sealing elements 44 shown in FIGS. 7 and 8 are each of triangular design in cross section.

The component 1 shown in FIG. 5 has a housing 8 having an inner side 9 and an outer side 10. The housing 8 is produced from a second material, the hardness of which is different from the hardnesses of the respective first materials. As is apparent in FIG. 6, the housing 8 of the component 1 shown in FIG. 5 has two mutually parallel and opposite sealing elements 17, which extend over almost the entire width of the housing 8 and closely adjoin the inner side 9 of the two-dimensionally extending decorative element 2. According to FIG. 5, each of the two sealing elements 17 engages in a recess 26 in the second layer 45. When viewed in cross section, the sealing elements 17 are of rectangular design. The back side 4 of the two-dimensionally extending decorative element 2, the rear side 7 of the second layer 45 and the inner side 9 of the housing 8 jointly delimit an enclosed space 46. The housing 8 is secured by means of the inner side 9 on a circumferential end face 25 of the two-dimensionally extending decorative element 2.

The material from which the first layer 50 is produced has a greater hardness than the material from which the diffuser 34 is produced. The material from which the second layer 45 is produced has, in turn, a greater hardness than the material from which the first layer 50 is produced, and the material from which the housing 8 is produced has, in turn, a greater hardness than the material from which the second layer 45 is produced. The diffuser 34, the first layer 50 and the second layer 45 are preferably produced from silicone, in particular from silicone rubber. The material, e.g. the silicone, from which the diffuser 34, the first layer 50 and the second layer 45 are produced preferably has a Shore A hardness in the range of 5-90, which is preferably measured in accordance with DIN ISO 7619-1, February 2012. Since the diffuser 34, the first layer 50 and the second layer 45 have a different hardness, the composition of the material, e.g. of the silicone, from which the diffuser 34, the first layer 50 and the second layer 45 are produced, is different. The material from which the housing 8 is produced preferably comprises at least one thermoplastic and preferably has a hardness in the range of 10-200 N/mm², which is preferably measured in accordance with DIN EN ISO 2039-1, June 2003.

Owing to the greater hardness of the first layer 50 relative to the diffuser 34, the first layer 50 can engage in the diffuser 34 during the joining of the first layer 50 and the diffuser 34. During joining, the material of the diffuser 34 is displaced, compressed or deformed, in particular elastically deformed, by the material of the first layer 50, for example. What has been stated in connection with the joining of the first layer 50 and the diffuser 34 also applies analogously to the joining of the second layer 45 to the first layer 50 and to the joining of the housing 8 to the second layer 45.

As can be seen in FIG. 5, the component 1 has a first lighting element 52, which is designed as a light emitting diode, wherein lighting element 52 is arranged adjacent to a lateral surface 38 of the first layer 50 in order to couple light into the first layer 50. The component 1 furthermore has a second lighting element 53, which is arranged underneath the first lighting element 52 and is designed as a light emitting diode, wherein lighting element 53 is arranged partially in a recess 16 in the second layer 45. Electric power is fed to the first lighting element 52 and the second lighting element 53 via an electric power transmission element 22 of the component 1, which is designed as two connection cables.

As is apparent in FIG. 5, the sealing element 17 arranged adjacent to the lighting elements 52, 53 is arranged underneath the lighting element 53. This reduces the risk that light coupled into the second layer 45 by lighting element 53 will be disrupted by the sealing element 17 arranged underneath the lighting element 53 as the light propagates within the second layer 45. In particular, it can be seen in FIG. 5 that the sealing element 17 arranged underneath the second lighting element 53 has an outermost edge 54 and an innermost edge 55, wherein the outermost edge 54 faces the back side 4 of the two-dimensionally extending decorative element 2. The second lighting element 53 has a light emitting surface 56, wherein this surface 56 is arranged in such a way relative to the innermost edge 55 that the light emitted by the surface 56 is radiated into a region of the second layer 45 which extends away from the innermost edge 55 in a direction away from the outermost edge 54. This offers the advantage that the light propagating in the second layer 45 is not disrupted by the sealing element 17 arranged underneath lighting element 53.

Of course, the above invention is not restricted to the embodiments described, and a large number of modifications is possible.

For example, the component 1 shown in FIG. 1, instead of having a layer 5 cast onto the back side 4 of the two-dimensionally extending decorative element 2 and of the foil 13, can have a layer 5' in which a lighting element 20 or a lighting module 18 is completely embedded and which is arranged directly underneath the foil 13, with the result that there is a gap, preferably containing air, between the layer 5' and the back side 4 of the two-dimensionally extending decorative element 2 and of the foil 13. This gap is advantageous particularly if the layer 5' is provided for the purpose of guiding light.

Light deflecting structures 61 can be provided on the rear side 7 of the layer 5 of the component shown in FIG. 1 or on the front side 6 and/or the rear side 7 of the layer 5'. Light deflecting structures 61 can also likewise be provided on the front side 6 and/or the rear side 7 of the first layer 50 and/or on the front side 6 and/or the rear side 7 of the second layer 45 of the component 1 shown in FIG. 5. Instead of the light deflecting structures 61 arranged on said layers 5, 5', 45, 50, it is also possible, for example, for light deflecting structures to be incorporated in the layers 5, 5', 45, 50. The incorporated light deflecting structures are less susceptible to damage. A large number of further modifications is possible.

The invention claimed is:

1. A component comprising
   a two-dimensionally extending decorative element having a visible side and a back side,
   a layer produced from a first material or a plurality of layers produced from first materials, wherein the layer or the plurality of layers is/are each arranged on the back side of the two-dimensionally extending decorative element and each layer has a front side and a rear side, wherein the front side in each case faces the back side of the two-dimensionally extending decorative element,
   at least one lighting element for coupling light into the layer or into at least one of the plurality of layers,
   at least one electric power transmission element for supplying the lighting element with electric power, and
   a housing produced from a second material and having an inner side and an outer side,
   wherein the inner side faces the respective rear sides of the layer or of the plurality of layers,
   wherein the second material has a hardness which is greater than the hardness of the first material or than the hardnesses of the first materials,
   wherein the housing engages in at least one recess, which is arranged in the layer or in one of the plurality of layers,
   wherein the housing has at least one aperture, wherein the inner side of the housing forms an inlet opening of the aperture and the outer side of the housing forms an outlet opening of the aperture, and wherein the electric power transmission element extends at least through the aperture from the inner side to the outer side of the housing, and
   wherein the housing has, on the inner side, a sealing element designed as an elevation and pointing in the direction of the rear sides of the layer or of the plurality of layers, wherein the sealing element engages in the at least one recess, which is arranged in the layer or in one of the plurality of layers, and displaces, compresses or deforms the first material, and wherein the sealing element at least partially forms the inlet opening of the aperture.

2. The component as claimed in claim 1, wherein the layer or the plurality of layers is/are in each case produced from a translucent material.

3. The component as claimed in claim 1, wherein the layer or the plurality of layers is/are in each case produced from silicone or PMMA block copolymer.

4. The component as claimed in claim 1, wherein the lighting element is embedded at least partially in the layer or in one of the plurality of layers.

5. The component as claimed in claim 4, wherein the lighting element is embedded completely in the layer or in one of the plurality of layers.

6. The component as claimed in claim 1, wherein the lighting element is arranged between the back side of the two-dimensionally extending decorative element and the inner side of the housing.

7. The component as claimed in claim 1, wherein the second material, from which the housing is produced, has a ball impression hardness in the range of 10-200 N/mm², wherein the ball impression hardness is measured in accordance with DIN EN ISO 2039-1, June 2003, and wherein the first material or the first materials, from which the layer or the plurality of layers is/are produced, in each case has/have a Shore A hardness in the range of 5-90, wherein the Shore A hardness is measured in accordance with DIN ISO 7619-1, February 2012.

8. The component as claimed in claim 1, wherein the at least one recess is a pre-produced recess.

9. The component as claimed in claim 1, wherein the first material or the first materials, from which the layer or the plurality of layers is/are produced, can be displaced and/or compressed and/or deformed by the second material, from which the housing is produced.

10. The component as claimed in claim 1, wherein the housing forms a back wall of the component on an opposite side of the component from the visible side of the two-dimensionally extending decorative element.

11. The component as claimed in claim 10, wherein the back wall (62) forms a back side (63) of the component (1).

12. The component as claimed in claim 10, wherein the housing (8) forms at least one side wall (64) of the component (1), which is arranged between the visible side (3) of the two-dimensionally extending decorative element (2) and the back side (63) of the component (1).

13. The component as claimed in claim 1, wherein the housing is produced from an opaque material.

14. The component as claimed in claim 1, wherein the layer or at least one of the plurality of layers is designed as a diffuser.

15. The component as claimed in claim 1, wherein the sealing element completely forms the inlet opening of the aperture.

* * * * *